US008386597B2

(12) United States Patent
Fulgham et al.

(10) Patent No.: US 8,386,597 B2
(45) Date of Patent: Feb. 26, 2013

(54) SYSTEMS AND METHODS FOR THE PROVISION OF DATA PROCESSING SERVICES TO MULTIPLE ENTITIES

(75) Inventors: Mark T. Fulgham, Mountain View, CA (US); Wesley D. Stauffer, Bloomfield, MI (US); Paul W. Bohlman, Lake Orion, MI (US); Charles D. Green, Frisco, TX (US); Yea-Yuan B. VanEgeren, Troy, MI (US); James M. Ballestro, Allen, TX (US); Subhashini Mukundan, Troy, MI (US); Lawrence Angelo, Shelby Township, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1203 days.

(21) Appl. No.: 11/223,537

(22) Filed: Sep. 9, 2005
(Under 37 CFR 1.47)

(65) Prior Publication Data
US 2007/0067175 A1    Mar. 22, 2007

(51) Int. Cl.
*G06F 15/173* (2006.01)
(52) U.S. Cl. ........................................ 709/224
(58) Field of Classification Search .................. 709/223, 709/224
See application file for complete search history.

(56) References Cited

U.S. PATENT DOCUMENTS

| 5,987,513 | A  | * | 11/1999 | Prithviraj et al. | 709/223 |
| 6,208,345 | B1 | * | 3/2001  | Sheard et al. | 715/853 |
| 2001/0052108 | A1 | * | 12/2001 | Bowman-Amuah | 717/1 |
| 2003/0037174 | A1 | * | 2/2003  | Lavin et al. | 709/313 |
| 2004/0107125 | A1 | * | 6/2004  | Guheen et al. | 705/7 |
| 2006/0041660 | A1 | * | 2/2006  | Bishop et al. | 709/224 |
| 2006/0046660 | A1 | * | 3/2006  | Tapaninen et al. | 455/67.11 |
| 2006/0282400 | A1 | * | 12/2006 | Kalavacharla et al. | 707/1 |

OTHER PUBLICATIONS

International Preliminary Report on Patentability, PCT/US2006/034589, Mar. 20, 2008, pp. 1-7.

* cited by examiner

*Primary Examiner* — Liangche A Wang
*Assistant Examiner* — Cheikh Ndiaye

(57) ABSTRACT

In exemplary embodiments of the present invention, information integration software can be used to gather and transform information from data processing system monitors and present the information in one or more custom screens or views which can enable operations personnel and management personnel to manage and operate a system with a minimum of human resources, fatigue and cost. In exemplary embodiments role-based screens can be specifically prepared for use by individuals performing such roles in an entity or organization. In exemplary embodiments of the present invention custom views can be prepared for production managers, financial managers, human resources managers, etc., using similar techniques.

30 Claims, 26 Drawing Sheets

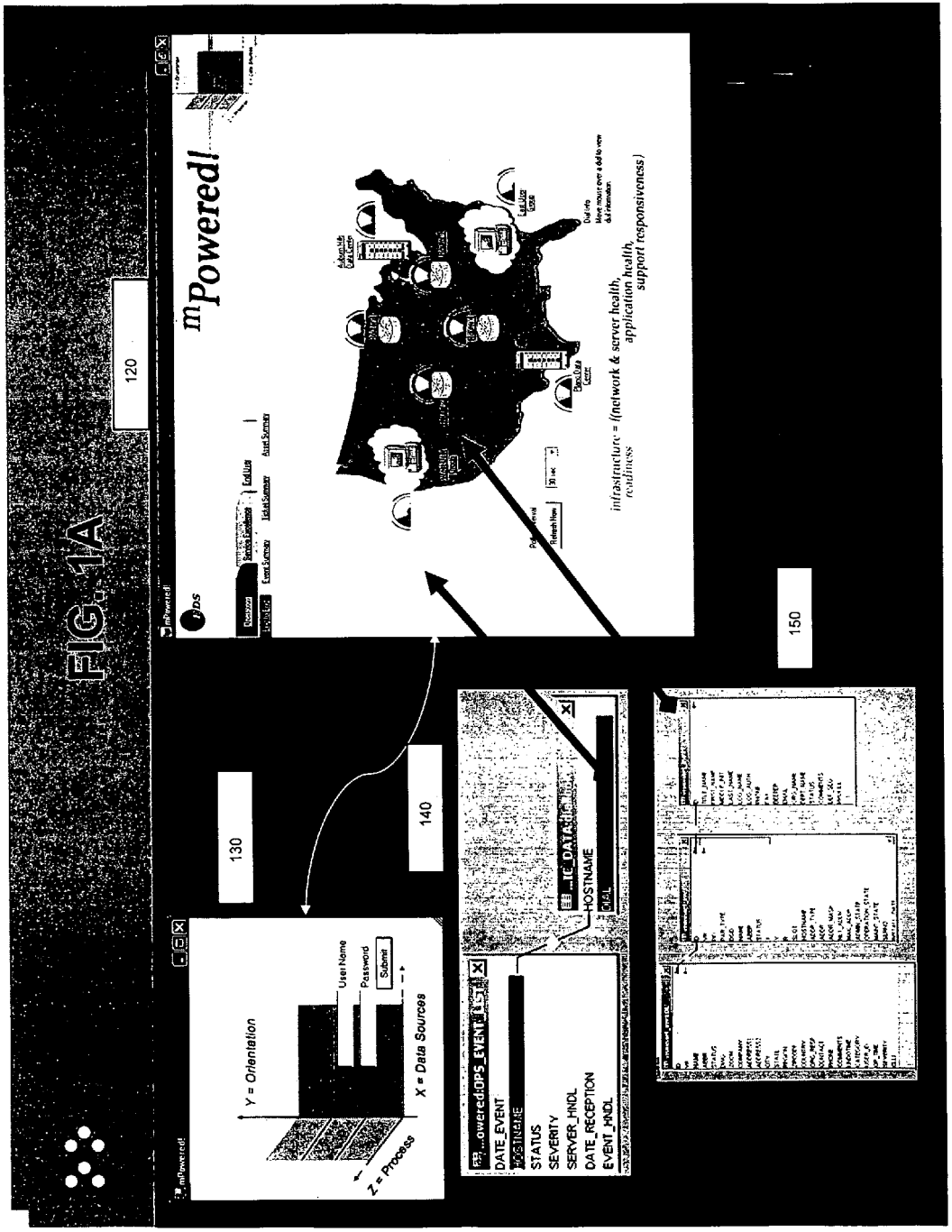

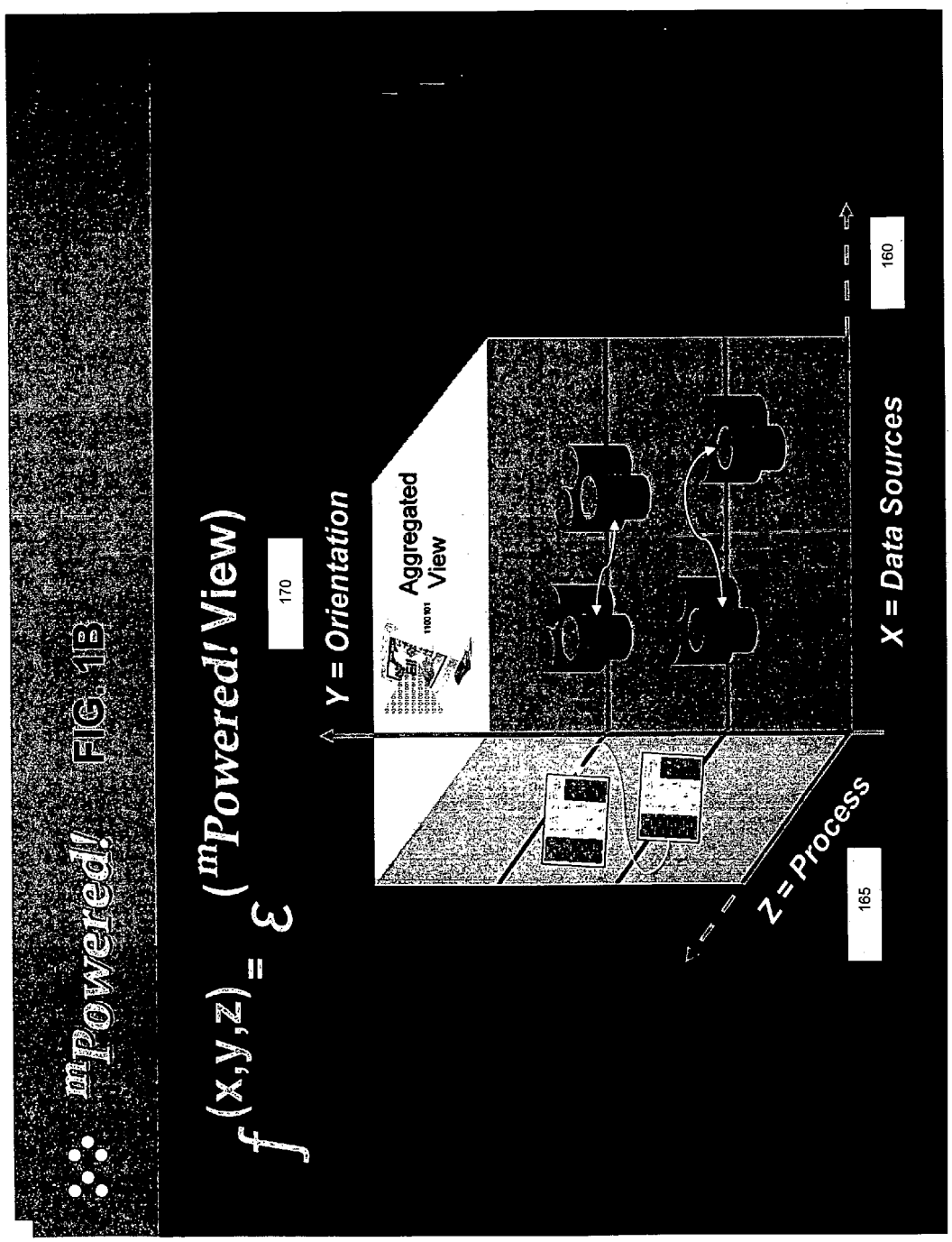

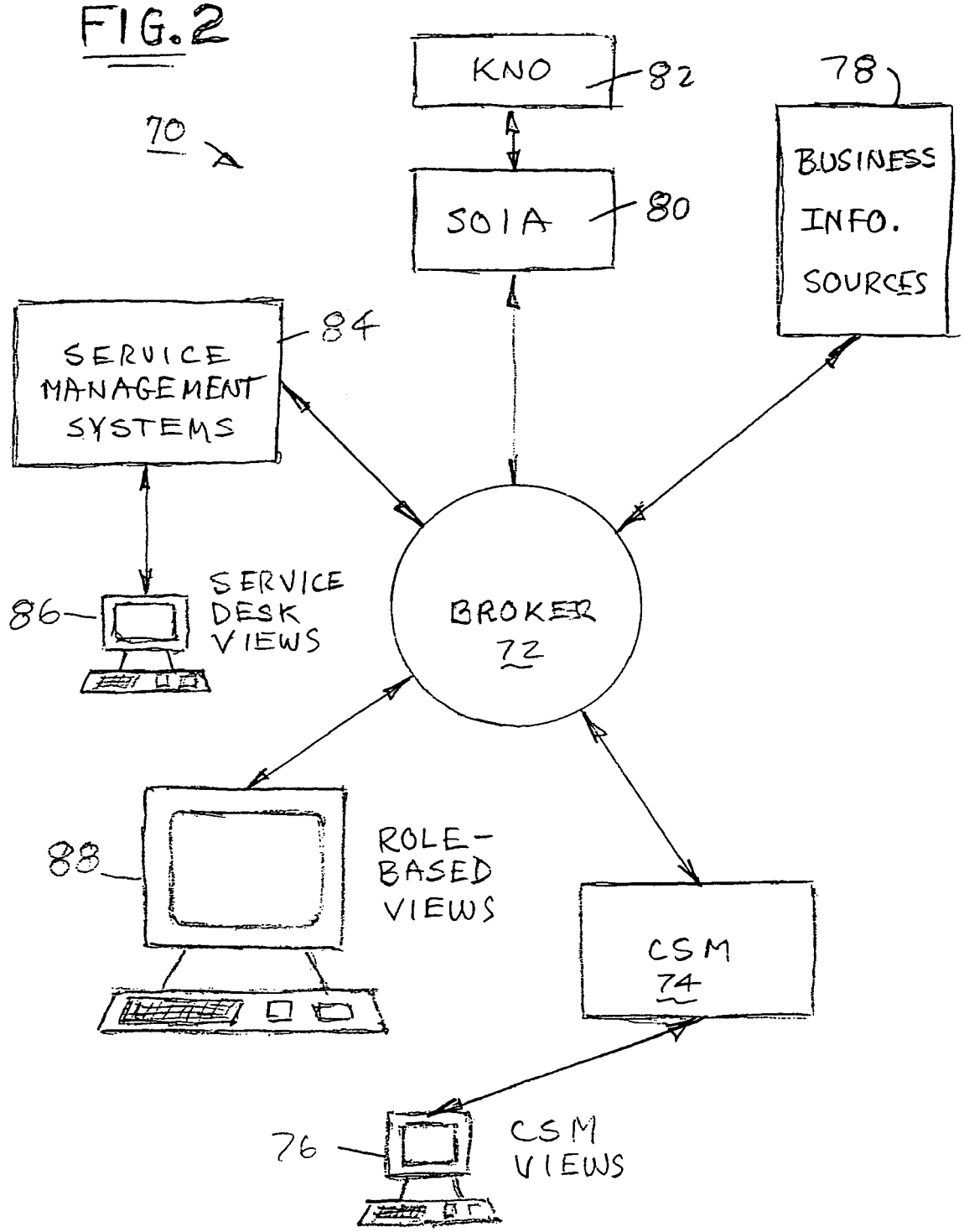

Tickets

| TIME OPENED | TICKET ID | STATUS | SEVERITY | HC |
|---|---|---|---|---|
| 9/17/2003 3:24 PM | 001-02-69 | resolved | Critical | eS |
| 9/17/2003 4:10 PM | 001-02-70 | resolved | Major | eS |
| 9/18/2003 1:52 PM | 001-02-77 | resolved | Medium | eS |
| 9/18/2003 1:54 PM | 001-02-78 | resolved | Medium | eS |
| 9/18/2003 1:55 PM | 001-02-79 | resolved | Medium | eS |
| 9/18/2003 1:57 PM | 001-02-80 | resolved | Medium | eS |
| 9/18/2003 1:59 PM | 001-02-81 | resolved | Medium | eS |
| 9/18/2003 2:00 PM | 001-02-82 | resolved | Medium | eS |
| 9/18/2003 2:02 PM | 001-02-83 | resolved | Medium | eS |
| 9/18/2003 2:03 PM | 001-02-84 | resolved | Medium | eS |
| 9/18/2003 2:04 PM | 001-02-85 | resolved | Medium | eS |
| 9/18/2003 2:06 PM | 001-02-86 | resolved | Medium | eS |
| 9/18/2003 2:22 PM | 001-02-93 | resolved | Medium | eS |
| 9/18/2003 2:23 PM | 001-02-94 | resolved | Medium | eS |
| 9/18/2003 2:27 PM | 001-02-95 | resolved | Medium | eS |
| 9/18/2003 2:28 PM | 001-02-96 | resolved | Medium | eS |
| 9/18/2003 2:10 PM | 001-02-97 | resolved | Medium | eS |
| 9/18/2003 2:12 PM | 001-02-98 | resolved | Medium | eS |

_112_

Ticket Details

| IP Address | Users Impacted |
|---|---|
| 130.175.20.71 | E 1 |

| Last Updated | Anticipated Close |
|---|---|
| 2003-10-07 14:49:47.0047 | 2003-10-07 14:49:47.0047 |

| Opened By | Assignee Name |
|---|---|
| Ga Tsst | TSST-GEOR |

| Category | Problem Type |
|---|---|
| shared infrastructure | cannot reach application |

Brief Description
Test Incident for eSMT

Related Tickets

| TIME OPENED | TICKET ID | STATUS |
|---|---|---|
| 2003-09-17 16:10:35.0035 | 001-02-70 | resolved |

Assets

| MANUFACTURER/MODEL | LOCATION |
|---|---|

Events

| HOSTNAME | STATUS | SEVERITY |
|---|---|---|

...ummary _114_
- number
- category
- open_time
- opened_by
- priority_code
- severity_code
- update_time
- assignment
- referral_time
- referred_to
- alert_time

...mary _116_
- number
- location
- contact_ph...
- parent
- domain
- change_no
- last_name
- first_name
- title
- document_id
- dept
- quote_no
- sla_contact
- sla_vendor

...robsummary _118_
- number
- downtime_end
- downtime_start
- assignee_name
- respond_time
- actor
- format
- countdw
- respond_to_onsite
- final_close
- open_group
- alert_status
- deadline_group
- deadline_alert
- pending_date

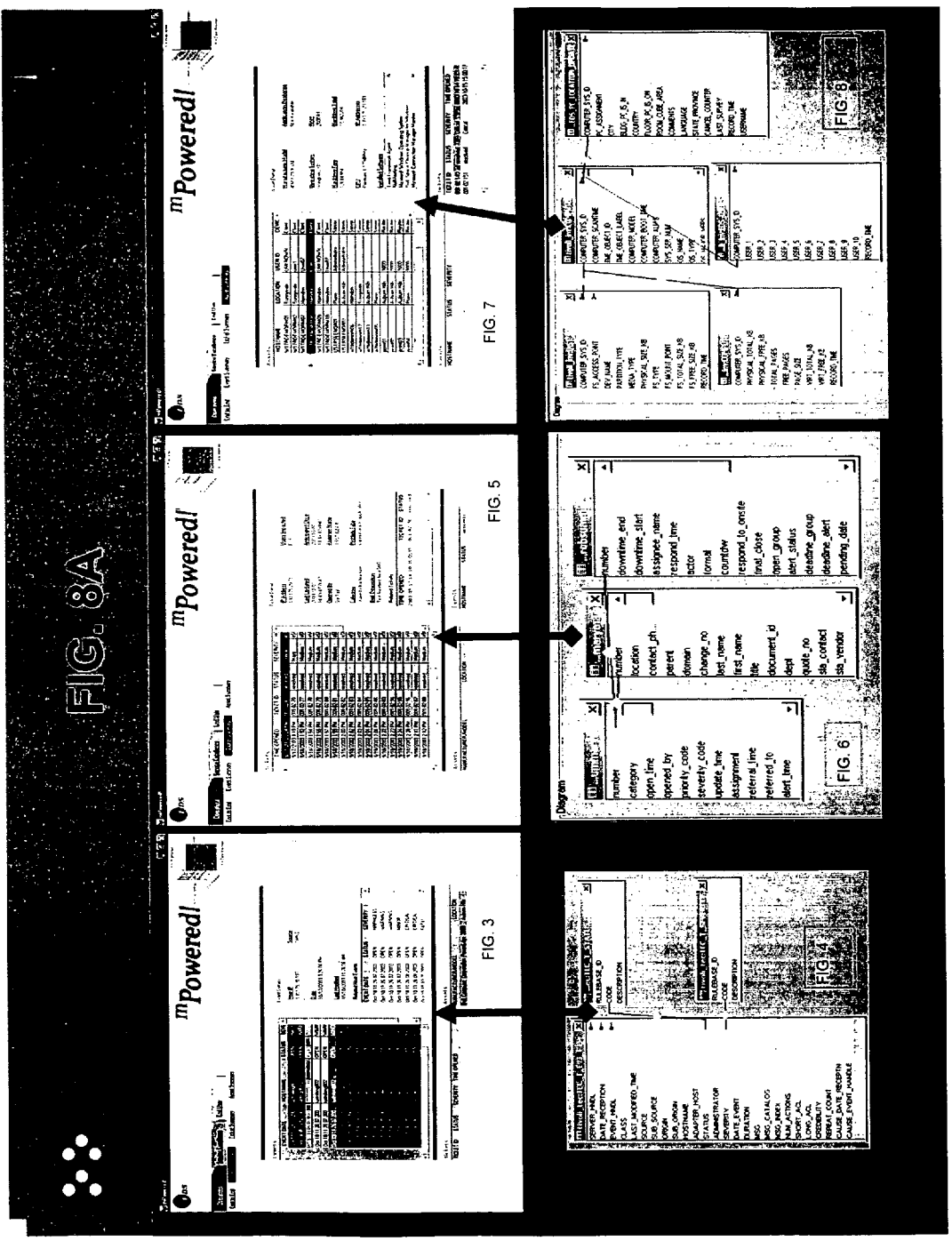

Working Capital Management.

| | Yield | Term |
|---|---|---|
| 1-mo CDs: | 1.0% | 1 |
| 3-mo CDs: | 4.0% | 3 |
| 6-mo CDs: | 9.0% | 6 |

214

Purchase CDs in months:
1, 2, 3, 4, 5 and 6
1 and 4
1

216

Interest Earned
Total $7,700

218
220

| Month: | Month 1 | Month 2 | Month 3 | Month 4 | Month 5 | Month 6 | End |
|---|---|---|---|---|---|---|---|
| Init Cash: | $400,000 | $205,000 | $216,000 | $237,000 | $158,400 | $109,400 | $125,400 |
| Matur CDs: | | 100,000 | 100,000 | 110,000 | 100,000 | 100,000 | 120,000 |
| Interest: | | 1,000 | 1,000 | 1,400 | 1,000 | 1,000 | 2,300 |
| 1-mo CDs: | 100,000 | 100,000 | 100,000 | 100,000 | 100,000 | 100,000 | |
| 3-mo CDs: | 10,000 | | | 10,000 | | | |
| 6-mo CDs: | 10,000 | | | | | | |
| Cash Uses: | 75,000 | (10,000) | (20,000) | 80,000 | 50,000 | (15,000) | 60,000 |
| End Cash: | $205,000 | $216,000 | $237,000 | $158,400 | $109,400 | $125,400 | $187,700 |

Color Coding
- Target cell
- Changing cells
- Constraints

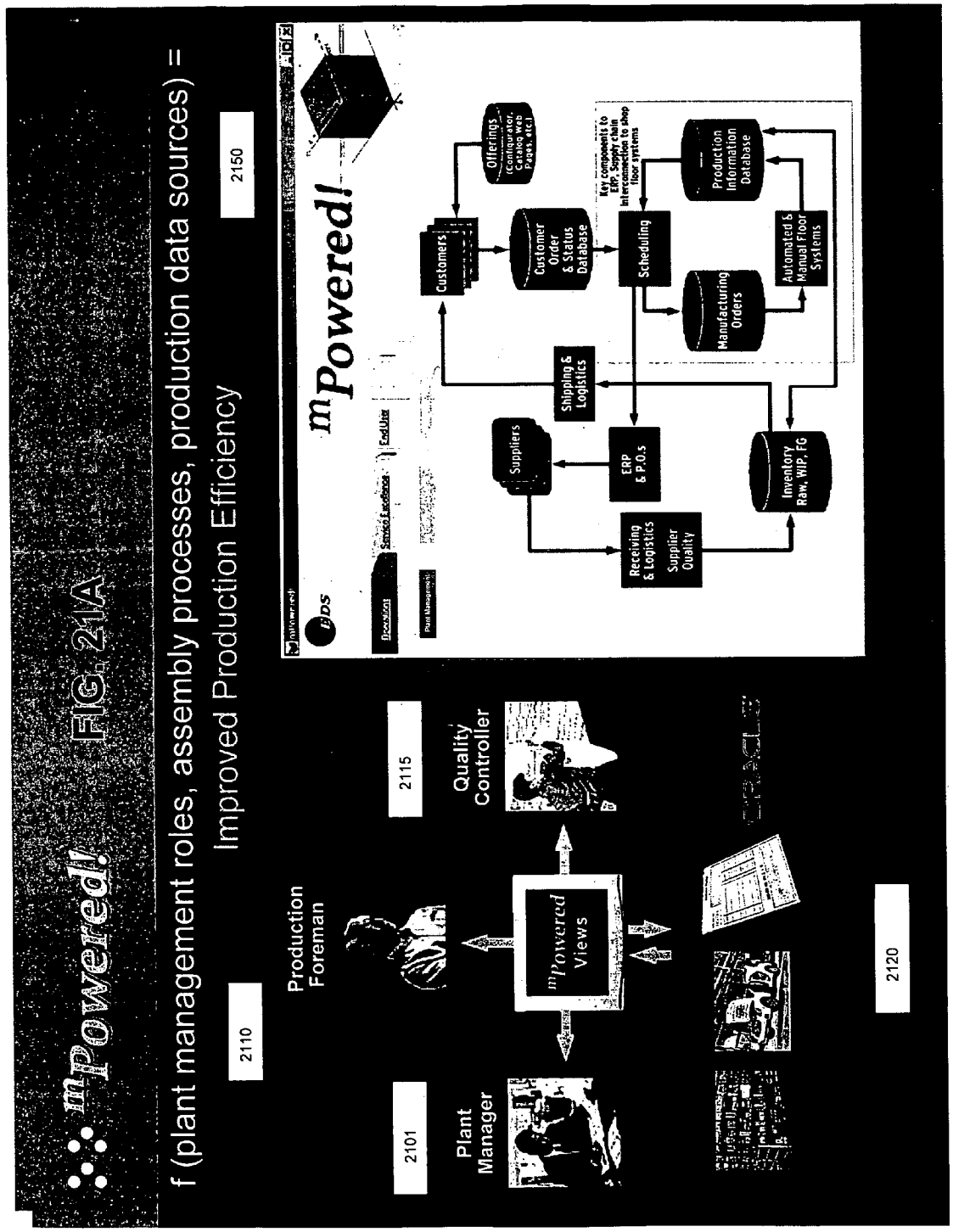

SYSTEMS AND METHODS FOR THE PROVISION OF DATA PROCESSING SERVICES TO MULTIPLE ENTITIES

TECHNICAL FIELD

The present invention relates to enterprise service management, and more particularly, to systems and methods enabling a single service provider to contemporaneously supply data processing services to a number of different enterprises or entities.

BACKGROUND OF THE INVENTION

Data processing service providers often simultaneously provide services to a number of different users by utilizing a large area network. For example, computer equipment can be located and maintained efficiently at one or more remote data centers that can be interconnected with on-site workstations at various user facilities through such a network. Such data processing service providers generally have the responsibility for providing adequate computing capacity to the users, and for maintaining and ensuring the maximum availability of computer systems on a day-to-day basis.

Such data processing services can be provided to organizations involved in a wide variety of activities. For example, services can be simultaneously provided to manufacturers, transportation system operators such as, for example, airlines or railways, financial institutions, governmental institutions, etc.

There are special problems associated with providing data processing services in multi-user service systems. Most such users tend to use computer equipment of their own choosing prior to turning the data processing job over to a service provider. Thus, the monitoring equipment needed by a service provider to check on the operating condition of the equipment used by each customer will generally be different.

This state of affairs can create a problem which impedes the service provider from achieving the maximum economy possible from centralized monitoring of the systems being serviced.

In general, in order to maximize efficiency and lower operating costs, data service system operators and managers would simultaneously monitor the performance of the data processing operations of two or more different customers. However, the proliferation of different types of monitoring equipment used by the various customers can make this a very difficult to accomplish.

Some service providers, whose primary source of income is the manufacture and/or sales of computer and monitoring equipment tend to replace the self-chosen equipment of new customers with their own products. While this can achieve a certain measure of standardization, it does so at a very substantial cost to the customer.

Accordingly, it is an object of the present invention to alleviate or resolve the foregoing problems. In particular, it is an object of the present invention to provide a system and method for providing data processing services to multiple users at a relatively low cost of new equipment for new service customers.

It is another object of the invention to provide a system and method for providing data processing services with increased efficiency of operating and management personnel, as well as of customer personnel.

Often, data processing service customers desire to have more than one data processing service provider at the same time. This, in the eyes of such customers, promotes competition between the service providers to do a better job, reduces costs, and has other perceived advantages. However, an additional problem is caused by such an arrangement.

The monitors, formats and screens used by one service provider will usually be quite different from those used by another provider. Thus, the information given to the customer on its monitors regarding the operation of each of the two data processing systems will be in different formats, and on different equipment. This requires increased amounts of learning time for employees to become familiar with the differing equipment and formats. Therefore, the customer and, to the extent that one service provider sees information sent to the other, the service providers themselves, suffer. The information they need is not provided efficiently.

Accordingly, it is another object of the present invention to provide a data processing service system and method in which multiple service providers can provide information to their personnel and/or their customers in a standardized format. In providing data processing services, it is common to provide "help desk" services to each customer, by means of which the customer can report service outages and have their computers and systems repaired and their service restored. Thus, another object of the invention to keep computer downtime to a minimum and the availability of computer systems to the customer at a maximum.

One of the measures of performance used to determine the quality of service is the "mean time to repair." That is, the mean of the various times required to repair service outages over a given calendar period of time. It is another object of this invention to reduce the mean time to repair.

Another measure for determining quality of service is the "mean time between failures." That is, the mean time separating service failures over a given time period. It is another object of the invention to reduce the mean time between failures.

A further measure of performance is the volume of calls made to the help desk by the customer. It is thus a further object of the invention to provide data processing system operational information in a more accessible form so as to enable better planning and reduce help desk call volumes.

The foregoing and other objects and advantages of the invention will be set forth in or apparent from the following description and drawings.

SUMMARY OF THE INVENTION

In exemplary embodiments of the present invention, information integration software can be used to gather and transform information from data processing system monitors and present such information in one or more custom screens or views which can enable operations personnel and management personnel to manage and operate a system with a minimum of human resources, fatigue and cost. In exemplary embodiments role-based screens can be specifically prepared for use by individuals performing various roles in an entity or organization. In exemplary embodiments of the present invention custom views can be also prepared for production managers, financial managers, human resources managers, etc., using similar techniques.

BRIEF DESCRIPTION OF THE DRAWINGS

FIG. 1A is an alternative view of the end-to-end view of FIG. 1, according to an exemplary embodiment of the present invention;

FIG. 1B is a detailed view of item 130 of FIG. 1A;

FIG. 2 is a schematic diagram illustrating software and related hardware used in an exemplary embodiment of the present invention;

FIG. 3 shows a trouble event summary screen according to an exemplary embodiment of the present invention;

FIG. 4 shows various sources from which information used to produce the trouble event summary screen of FIG. 3 was taken;

FIG. 5 shows a trouble ticket summary screen according to an exemplary embodiment of the present invention;

FIG. 6 shows the various data sources from which the information used to create the screen shown in FIG. 5 was taken;

FIG. 7 shows a data processing system asset summary view according to an exemplary embodiment of the present invention;

FIG. 8 shows the various data sources from which information comprising the view shown in FIG. 7 was taken;

FIG. 8A is a summary presentation of each of the exemplary screens shown in FIGS. 3, 5 and 7 and their respective data sources as shown in FIGS. 4, 6 and 8.

FIG. 14 shows another data processing system asset summary view according to an exemplary embodiment of the present invention;

FIG. 18A illustrates the connection between the data sources of FIGS. 16-18 and the exemplary screen shot depicted in FIG. 15.

FIG. 20 shows an example of financial management views that can be provided to business or other organizations according to an exemplary embodiment of the present invention;

FIG. 21A illustrates the exemplary production planning view of FIG. 21 in the context of other exemplary possible views according to an exemplary embodiment of the present invention.

Figure 1:
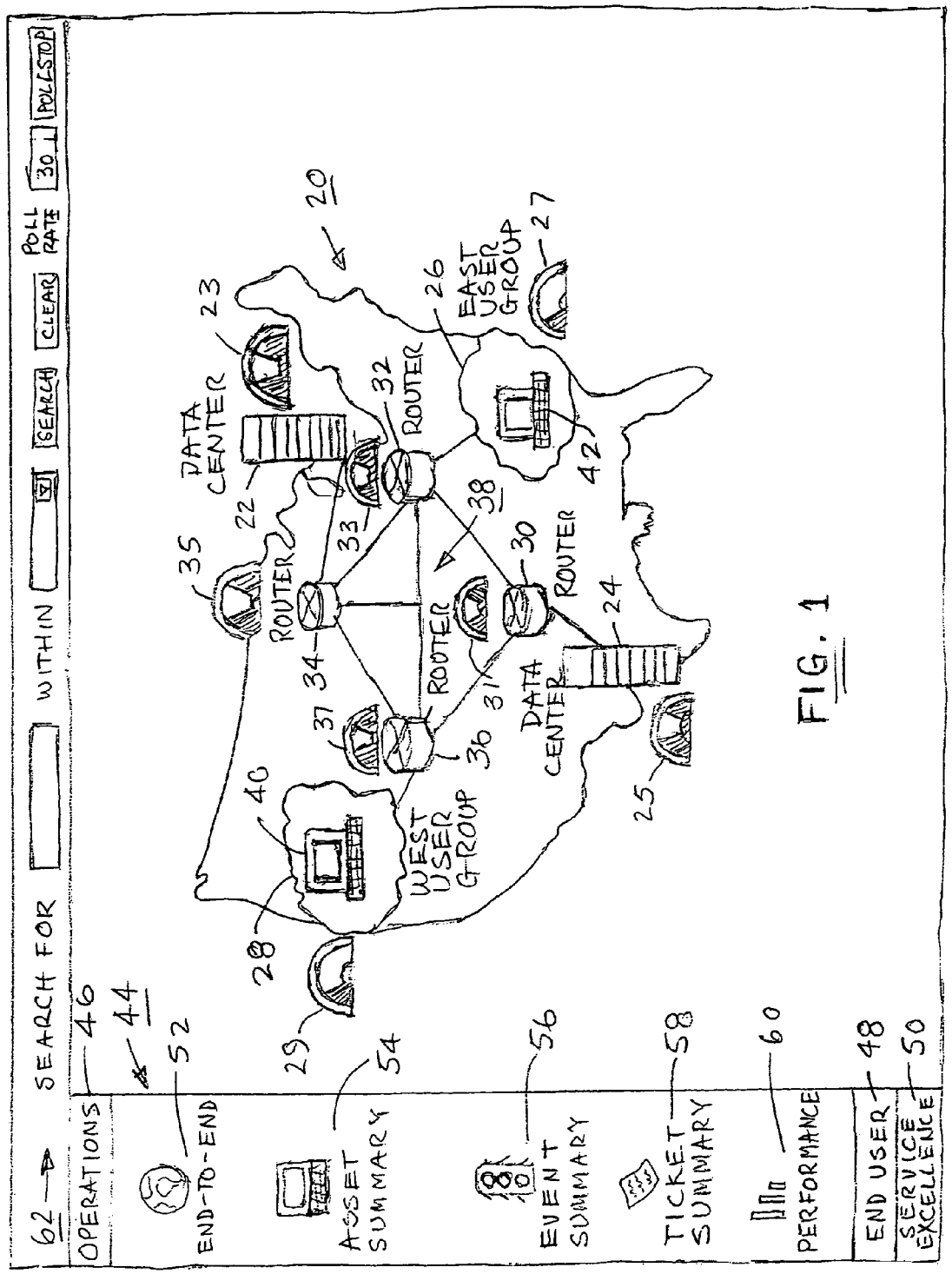
FIG. 1 is an exemplary view of a computer screen giving an end-to-end view of a data processing system according to an exemplary embodiment of the present invention.

It is noted that the patent or application file contains at least one drawing executed in color. Copies of this patent or patent application publication with color drawings will be provided by the U.S. Patent Office upon request and payment of the necessary fee.

It is further noted that some of the color drawings bear the proposed trademark ""'Powered!", a corresponding 3D logo and the tag line "f(x,y,z)='"Powered." Such proposed trademark, logo and tag line were used in an illustrative conceptualization of an exemplary embodiment of the present invention.

DETAILED DESCRIPTION OF THE INVENTION

In exemplary embodiments of the present invention, the above-described objects of the present invention can be met by the provision of data processing service systems and methods in which information regarding the operation of data processing systems for multiple customers, using a variety of differing data sources and equipment, can be consolidated and presented in a single format.

In exemplary embodiments of the present invention, the various screens displaying the information can, for example, display only the type and amounts of information needed by various personnel to perform their duties so as to reduce the time required to react to the information.

In exemplary embodiments of the present invention, screen views can be provided, for example, which are tailored to the needs of a person serving a specific role or function within the service organization. Preferably, the information given to each such person is the minimum needed for the person to perform his or her duties effectively. When this is the case, the system is said to provide that person with "just enough information", or "JEI."

It is an optional feature of the invention to provide special access to additional information to specific personnel, based on their needs.

In exemplary embodiments of the present invention, the same software used to provide custom views of information to service system personnel can be used, for example, to provide custom views to each of several different persons in the customer organization or enterprise, in accordance with the needs of their respective positions. For example, information can be presented in special views for production managers in a manufacturing facility, engineers in a design facility, financial managers, and a variety of other enterprise personnel according to their specific role or function within the enterprise.

In exemplary embodiments of the present invention, the same software can be used, for example, by multiple service providers that each provide service to the same enterprise. By this means, information can be presented to the customer by each service provider in a consistent format so as to increase the productivity and efficiency of those using the information.

The provision of services in accordance with exemplary embodiments of the present invention can be greatly enhanced by, for example, the ability of one operator or manager to monitor operations for multiple customers, thus increasing the productivity of each such operator or manager.

Similarly, it is believed that the mean time to repair, mean time between failures and volume of calls to the help desk all can be reduced by use of the invention.

Furthermore, it is believed that the efficiency and productivity of customer employees can be improved by the reduction of surplus information delivered, and the standardization of formats for the delivery of information.

In exemplary embodiments of the present invention, it can be possible to utilize the output from the existing equipment of a new data processing services customer with a minimum of equipment replacement. Thus, in exemplary embodiments of the present invention, there can be a reduction of the ancillary costs in the overcall cost of data processing services to the customer.

FIG. 1 illustrates schematically an exemplary data processing system 20 superimposed upon a map of the United States of America so as to indicate major components of the system and the general area of the country in which they are located. It is to be understood that this is simply one example of many different data processing systems in which the invention is useful.

The exemplary system 20 includes two data centers 22 and 24 located in different parts of the country, a substantial group of users, divided into an east user group 26 and a west user group 28, and several routers 30, 32, 34 and 36. All of the components described so far are interconnected by means of a network generally indicated at 38, such as, for example, a private network and/or the Internet.

Users in a user group typically have numerous workstations, schematically represented in FIG. 1 by personal computers 40 and 42. Such workstations are often located in widely separated plants and offices. Other features shown in FIG. 1 will be explained below in greater detail.

Typically, such a data processing system is operated and maintained by a data processing service provider, who controls and operates the data centers, the routers, and all of the system equipment so as to provide data processing services to users.

The users are typically of a variety of different types of organizations, such as, for example, manufacturers, transportation companies such as airlines and railways, financial institutions, governmental institutions, and virtually any other type of organization engaging in any human endeavor.

In general, the data processing services provided to such organizations are widely varied. For example, for airlines, data processing for reservations and ticketing, as well as for flight operations can be provided. For manufacturing businesses, inventory control, human resources management, engineering, production and other such operations can be supported. It is understood that many other data processing services can be and are provided.

The operational staff of a data processing service provider includes operators and managers, often physically located at the various data centers (such as 22 and 24 in FIG. 1), who monitor the operation of the system to keep it in satisfactory operating condition to perform the data processing functions required by the users. For this purpose, various types of monitoring equipment and software are used.

Further, employees of end users can also use monitoring equipment to determine the operational status of the data processing systems serving their needs. Depending upon a user's wishes, its employees can, for example, see much or all of the information available to the operational personnel of the data processing services provider.

Many organizations have their own data processing systems set up prior to employing an outside vendor to provide data processing services. Thus, the employees of the organization have usually become familiar with certain brands of equipment and operating formats before an outside vendor is employed.

As noted above, certain service providers, especially those who depend heavily upon equipment sales for their profits, generally insist that a user change its monitoring equipment to that of a specified vendor once such service providers become engaged. While this can create uniformity in the equipment used by its various clients, it is very costly, can also be both in new equipment costs and in retraining employees to use the new equipment.

In exemplary embodiments of the present inventors, users are not required to change all of their monitoring equipment and software. Rather, the invention makes it possible to easily use a variety of different types of equipment and to transform and present the information output by them in a standard format that can be easily understood by operating and management personnel, both at the service provider and at the end user.

FIG. 1A illustrates an operative view of the information presented in FIG. 1, according to an alternative exemplary embodiment of the present invention. Moreover, FIG. 1A illustrates how various data sources are collected and represented in the end-to-end view depicted in screen 120, FIG. 1A. As noted above, exemplary screen shot 120 in FIG. 1A, as well as a number of the other figures or screen shots described below, bear the logos and taglines of an exemplary embodiment of the present invention entitled "′″Powered!". With reference to FIG. 1A, screen 130 is an exemplary opening screen of a software tool, according to an exemplary embodiment of the present invention. As can be seen, screen 130 has fields for a user to enter a user name as well as a password, and bears an exemplary name and logo for the ′″Powered! system. The idea behind the logo and symbology of the depicted exemplary software is shown in greater detail in FIG. 1B.

With reference to FIG. 1B, functionalities of the exemplary software tool according to an exemplary embodiment of the present invention are illustrated in a "cube of relationships." In such a "cube of relationships", the X axis can represent the various data sources 160, the Z axis can represent various processes 165 and the Y axis can represent the orientation or aggregated view 170 that can be presented to a user. The mathematical symbology at the upper left of FIG. 1B is a way of articulating the idea that the "′″Powered!" view is a function of all three of such axes, i.e., the data sources, the processes which operate and/or connect those data sources and the orientation or particular perspective of a given user to whom a view is presented.

Returning to FIG. 1A, by logging in to an opening screen 130 a user can, for example, be shown a screen presenting end-to-end view such as the type depicted in screen 120. Screen 120 can itself be composed of information drawn from various data sources, as is illustrated in screens 140 and 150. In each of screens 140 and 150, there is a connection between various data sources, and these various data sources, through the illustrated connections, can be used to present information in the end-to-end view 120. For example, at 140, there is an event list appearing at the left side of the screen, and in that event list there is an element entitled "HOST NAME". In a dial look-up database shown at the right side of the screen 140, a HOST NAME, entitled "DIAL" is depicted. Therefore, the two data sources as shown at 140 can be aggregated and presented as the dial to the immediate left of the west user group in screen 120, as indicated by the arrow running from screen 140 to the far left of screen 120. A similar state of affairs pertains with respect to the three data sources listed in screen 150, and the aggregation and presentation of the information contained in these three data sources in Router 2 shown in end-to-end view 120.

FIG. 2 is a schematic diagram illustrating an exemplary system 70 showing software and some hardware that can be used in accordance with an exemplary embodiment of the present invention to achieve the results described above. With reference to FIG. 2, at least one, but preferably more than one, component systems management ("CSM") units are provided at 74. Each CSM unit can include, for example, software installed on a computer and a display such as display unit 76. The CSM units can, for example, display operational parameters of the data processing system.

The CSM systems can communicate with a "Broker" software unit 72. Broker 72 can also communicate with various business information sources 78 and service-oriented impact analysis software 80. Moreover, such service-oriented impact analysis software can itself be supplemented by "knowledge" software 82. Programs 80 and 82 can facilitate decision making in operating a data processing system, as described in greater detail below.

Broker 72 can also communicate with Service Management systems 84. These systems can, for example, provide information to Service Desk terminals 86, and can also provide "trouble tickets", etc., for repairing portions of the data processing system that may have malfunctioned.

In exemplary embodiments of the present invention, Broker 72 can select, consolidate and format information from the various available sources and provide specialized views to facilitate management of the data processing system. Such views can, for example, be displayed on display units 88. Thus, in FIG. 2, terminal 88 can represent, for example, web-based terminals located in service provider facilities, as well as web-based terminal facilities. Thus, specialized views can be presented both to data processing system personnel, as well as to end-user personnel.

It is understood that the communications links to the various displays 86, 88, and 76 can, for example, include web servers and other network communications equipment. Such communications equipment is not shown in the drawings for simplicity of illustration.

Component Systems management ("CSM") Software

Continuing with reference to FIG. 2, CSM software 74 can include, for example, any of a number of commercially available software packages for monitoring data processing operations. In general, each such program can, for example, be designed to detect and present visual reports of a variety of service events and parameters. Some examples of such software and their functions are next described.

One type of such software is sold under the trademark "Tivoli" by IBM. In particular, the Tivoli Enterprise Console software provides detailed reports of service events such as, for example, computer malfunctions and service outages. The Tivoli software can present much detailed information regarding such events on one or more monitors which can be viewed by operating personnel.

Another example of suitable CSM software is "BMC Patrol" sold by BMC Software. This software detects faults in servers in the data processing system and generates performance information and stores it in a data base. The server fault information and other information can be delivered to the computer using Tivoli Enterprise Console for further processing.

Another CSM program is "Service Centert™" sold by Peregrine Systems. This software provides asset management information—that is, information regarding hardware in the data processing system, and can also provide trouble ticket information for the help desk.

Another CSM program, called "Super Agent™" sold by NetQos Company, performs network performance management services and produces performance data.

Another program is "Unicenter™", sold by Computer Associates, which can detect service events (malfunctions, etc.) and collect inventory concerning hardware in the system.

Another program marketed by Hewlett-Packard is "Open View™". It can perform network management services and reports on network service events, etc.

Another CSM program is "Cisco Works™" sold by Cisco Systems. Cisco Works manages switches and routers in a data processing network.

A further CSM program is IBM's Tivoli™ inventory software which can be used to provide information regarding inventories of hardware in the data processing system.

Each of the several CSM software modules can produce reports that can be displayed on a computer screen. All of such software may be in use at the same location by operators whose responsibility it is to observe such screens.

The problem of keeping track of all of the various CSM screens is further exacerbated by the general desire of data processing management of a data processing system to provide what is known as "leveraged service delivery"; i.e., the use of a single operator to monitor service delivery systems for two or more different end users, thus increasing the efficiency of the operators and decreasing operating costs.

Such services are sometimes referred to as "swivel chair monitoring", because an operator might have to frequently turn his head so as to see numerous different monitors in the performance of his or her duties. This requirement tends to promote fatigue, inattention and the rapid "burnout" of employees. Thus, this state of affairs creates added expense and loss of efficiency due to the need to hire and train new operators on a relatively frequent basis.

This problem can be substantially eliminated by the systems and methods of exemplary embodiments of the present invention, as described below.

Broker

The software comprising Broker 72 (FIG. 2) can be referred to as "integration software", and can, for example, consist of one or more software modules A basic Broker 72 software module can consist of Enterprise Information Integration ("EII") software.

For example, suppose the Tivoli Enterprise Console is programmed to give an alert whenever a server or a storage disc becomes more than ninety-eight percent (98%) full of data. The occurrence of this event generates an alert on one of the screens. However, in order to fully analyze the problem an operator may have to look at four or more different monitors, including, for example, "BMC Patrol" and others. Each of such different monitors generally gives much more information than is necessary for the operator to analyze the problem, thus entangling an operator in sorting the wanted information from that which is not wanted. This can slow his or her reaction to the event.

In exemplary embodiments of the present invention, the information provided on screens custom made for the operators is enough all by itself, i.e., is "JEI", so that an operator need not look elsewhere. This can greatly reduce the number of monitors and the amount of information that an operator must sift through in order to determine what to do, and can thus make his or her task faster and easier to perform.

The EII software can be any of a number of commercially available programs. One which has been used and is preferred in the best mode of practicing the invention is that sold by Composite Software, Inc. of San Mateo, Calif. This software is a multi-threaded 100% Java application program which can run on a high-performance Unix, Linux or Windows server. It can connect to any source system that supports standard interfaces such as Web Services (SOAP/XML) or SQL (JDBC/ODBC) to extract information. It can be used, for example, in exemplary embodiments of the present invention to specify which information is to be extracted from each source, and can then be used to form specific computer screens combining the extracted information. Such software is designed to permit a business organization to present its computer information in a consistent format.

Other computer program packages are available for performing essentially the same function as the Composite Software program. For example, one package consists of "MetaBase", "Modeler" and "Server" by Metamatrix; and another is "Enterprise Data Hub", "Workbench" and adapters sold by Journee.

In exemplary embodiments of the present invention, other software can be included in the Broker. For example, additional software known as "ETL" software can be provided to extract, transform and load data from other sources so as to create a special data warehouse usable in providing data quickly and conveniently. Such software is available commercially from Oracle™ and PeopleSoft™ for example.

Another type of software, known as "EAI" or Enterprise Application Integration Software can also be used in Broker 72. It can be used, for example, to extract, transform and transfer information from one computer application to another. An example of EAI software according to an exemplary embodiment of the present invention is described in detail in Example A below.

Service Oriented Impact Analysis Software

Service oriented impact analysis software 80 can, for example, be one of a number of commercially available programs. For example, one such program is "Centauri" by Proximaz, and another is "Opticon" by Systar.

These software products can accept data input from CSM software systems, through Broker 72, to provide analysis of service problems and provide optimum solutions for problems.

For example, assume that a particular data processing system for a particular end user has two systems which are temporarily down. One has an availability requirement of 99.9%, pursuant to a governing service level agreement or SLA, and the other one has only a 98.2% availability requirement. The required decision is which one to first perform maintenance on. The service oriented impact analysis software can compute, based on various information that it receives, such as, for example, the service record for each sub-system during the past month, etc., and can give an indication of which to service first.

In exemplary embodiments of the present invention, "knowledge" software 82 can use stored examples from prior service-oriented problems to be used by the service oriented impact analysis software 80 in performing its function. The generic name for this type of software is "Customer Experience Management" software. Various university-developed products are available to fill this need. One commercial example of software available for this purpose is "Vital Knowledge, Inc."

Business Information Sources

Business information sources 78, from which business information can be obtained, can include, for example, human resources programs, inventory control programs, finance programs, production control programs and the like. These programs can be whatever an end user is currently using. Such information can be used, for example, in preparing screens for financial management, customer relations management, production management, etc., as will be described in greater detail below.

Service Management Systems

Service management systems 84 can include many different commercially available software products, which can serve the function of reporting service problems etc., to service desk 86 for action by the operators there. Trouble tickets can be prepared, etc. In generally, they manage customer requests for service.

Suitable software is "Service Center" by Peregrine (mentioned above); "Remedy ARS" sold by BMC Software; and "Vantive" sold by People Soft.

Custom Views

In exemplary embodiments of the present invention, the software system illustrated in FIG. 2 can be used, for example, to provide custom views to greatly facilitate the operation and management of the data processing system, and of the end user's operations.

In the specific example of such data a processing system, several different custom views can be provided. One is an "end-to-end" view. Others can include, for example, an "asset summary" view; an "event summary" view; a "ticket summary" view; and a "performance" view.

The views provided are advantageously "role-based." That is, specific views can be developed for personnel having different roles in the organization so as to enable them to more quickly and efficiently get the information they need to perform their duties. These views can, for example, include those for operations personnel, for end users, and for a role called "service excellence" which involves management of data processing service operations.

End-to-End View

One example of the custom views that can be provided by the invention is shown in FIG. 1 and FIG. 1A. These screens depict an end-to-end view of the entire data processing system 20 (FIG. 1) on a single screen.

With reference to FIGS. 1 and 1A, each of the data processing system components described above has a dial 23, 25, 27, 29, 31, 33, 35 and 37 next to it. In the depicted exemplary view, each dial has three areas of different colors, namely, green, yellow and red. This is illustrated in color in screen 120 of FIG. 1A. If the color displayed in the visible area of the dial is green or white, this indicates that the level of service outage events and open trouble tickets (service requests) are below dangerous levels. Dials 27 and 29 (and their analogous dials in FIG. 1A) illustrate this condition.

If a dial is yellow, as is the situation with the remaining dials in FIGS. 1 and 1A, this indicates that the number of outage events and open tickets is at a moderate level, tending toward dangerous. If the dial is red, this means that the outage events and open tickets level for the data center, router, or user group is unacceptably high and needs immediate remedial action.

When a cursor is placed over any of the dials, a screen is created which can display, for example, relevant information regarding the number of events, the number of open trouble tickets, inventory of equipment, and performance indications, such as overall availability of the equipment in question.

In accordance with an exemplary embodiment of the present invention, these items of information can be gathered together by use of the EII software in Broker 72 from various CSM units 74.

View and Role Selection

As is shown in FIG. 1, an icon array 44 can be provided in the left margin of the screen shown in FIG. 1. One of the icons 52 represents an end-to-end view as shown in FIG. 1. Other icons that can be selected include an icon 54 for Asset Summary; an icon 56 for Event Summary; an icon 58 for Ticket Summary; and an icon 60 for Performance.

In addition, three "buttons" 46, 48 and 50 can be provided to select the views available to operations personnel (46), service excellence personnel (service management personnel) (50), and end user personnel 48.

In exemplary embodiments of the present invention, each person gaining access to the system must enter a personal identity password, and select an appropriate role button, i.e., 46, 48 or 50. Each individual user will be given access only to the views which he or she is authorized to see. However, each individual can obtain special permission to see other screens. The other screens that the individual is authorized to see can be stored in memory and made ready for access whenever that person uses the system.

A tool bar 62 can also be provided on the screen for performing searches indicating the poll rate, i.e., the time in seconds between successive up-dates.

Role-Based Views

In exemplary embodiments of the present invention, custom made views, consisting of selected portions of the role-based views can be provided. Thus, custom-made views, consisting of selected portions of the information provided by the CSM software, can be provided as may be needed or desired by a person filling a particular role in an organization.

For a data processing service organization, the roles for which custom views can be provided can include, for example, operations personnel, "service excellence" or management personnel, and end users.

Operations personnel are those who watch the various monitors giving data about the operations of the system and institute remedial action.

Operations Views

Figures 3, 4:
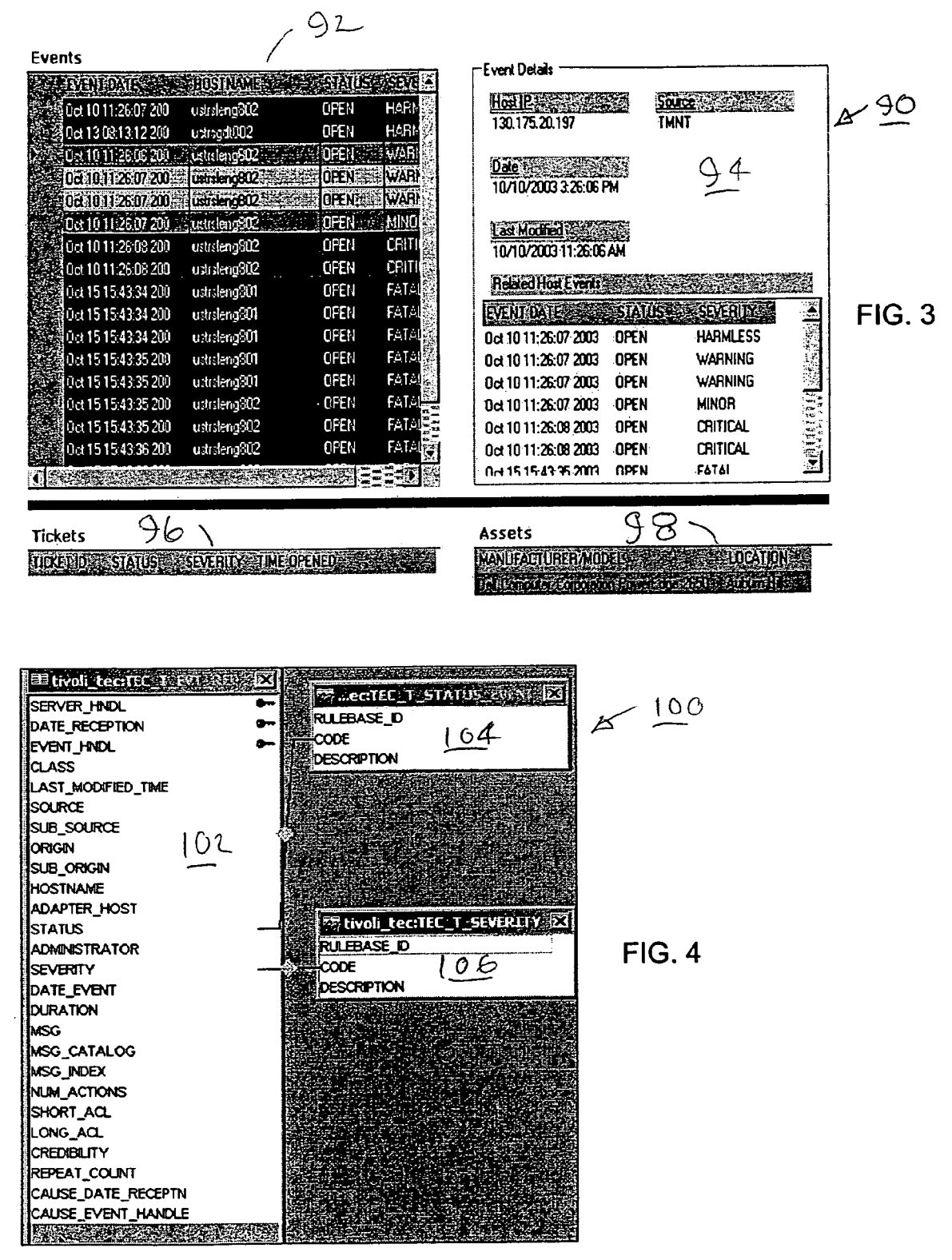
Figures 7, 8:
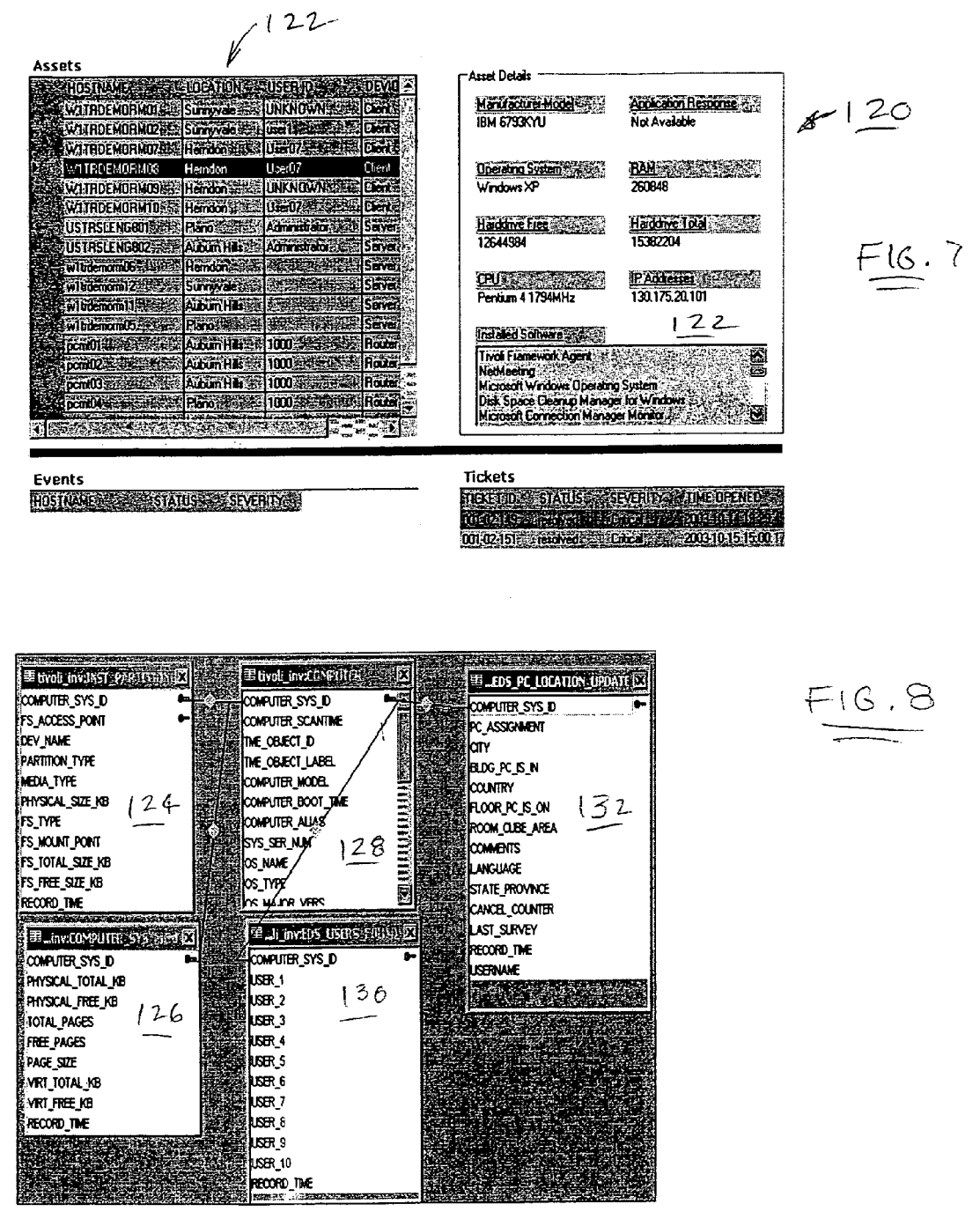

Operations personnel need to be able to see several different views giving types of data. One such view is the Event Summary view, which can be selected by clicking on icon 56 in FIG. 1. FIGS. 3, 5 and 7 depict examples of custom screens created to provide such data. FIGS. 4, 6 and 8, respectively, show the sources from which the information in FIGS. 3, 5 and 7 was taken. FIG. 8A shows all six of these figures with arrows indicating the interconnections between the summary screens of FIGS. 3, 5 and 7 and their respective data sources as shown in FIGS. 4, 6 and 8.

FIG. 3 shows a view 90 which provides a list 92 of events; that is, service outages not yet resolved. Details of the events are provided at 94 and further information is provided as shown at 96 and 98.

FIG. 4 shows, by way of example, a view 100 of three different sources 102, 104, and 106 from which the information for view 90 has been taken. In this case, it is the Tivoli Enterprise Console from which information has been extracted to present in view 90 of FIG. 3. In so doing, much extraneous information has been left out; only that information necessary to the proper evaluation of events for the system or sub-system being monitored is given.

An operator also can select icon 58 (FIG. 1) to call up the Ticket Summary view 108 shown in FIG. 5. Trouble ticket summary information appears in a table 110, with ticket details at 112.

The information given in view 108 of FIG. 5 gives a list of recent trouble tickets, their status and their severity, etc.

FIG. 6 shows three different exemplary items of source data 114, 116, and 118 from which the trouble ticket information shown in FIG. 5 was obtained.

It should be understood that the information given in screen 108, as well as in the other custom screens described herein, can be varied to the particular needs of the organization managing the data processing system.

FIG. 7 shows an Asset Summary view 120 which can be accessed by selecting the icon 54 in FIG. 1. The asset summary includes a table 122 listing the name of the asset, its location, its user identification, and the type of device it is, e.g., whether it is a server, router, client device, etc.

Asset details can be provided, for example, in another table 122.

FIG. 8 shows five different sources 124, 126, 128, 130, and 132 from which information can be extracted and consolidated to form screen 120 of FIG. 7. Most of the information shown has been obtained from the Tivoli Inventory console.

Service Excellence Views

Within the concept of the invention, data processing system managers usually have less need of detailed information than operating personnel. Therefore, custom screens can be made available to them and their access can be denied to some of the more detailed screens, unless an individual manager has established a need to see them and the system is programmed to give him access.

For example, a manager can input his user identification code and select the Service Excellence button 50 shown in FIG. 1. The end-to-end view of FIG. 1 (or FIG. 1A) is on the home screen, and can be selected by means of end-to-end icon 52 in FIG. 1. If a manager selects icon 60 for Performance, the view of FIG. 9 will appear.

Figure 9:
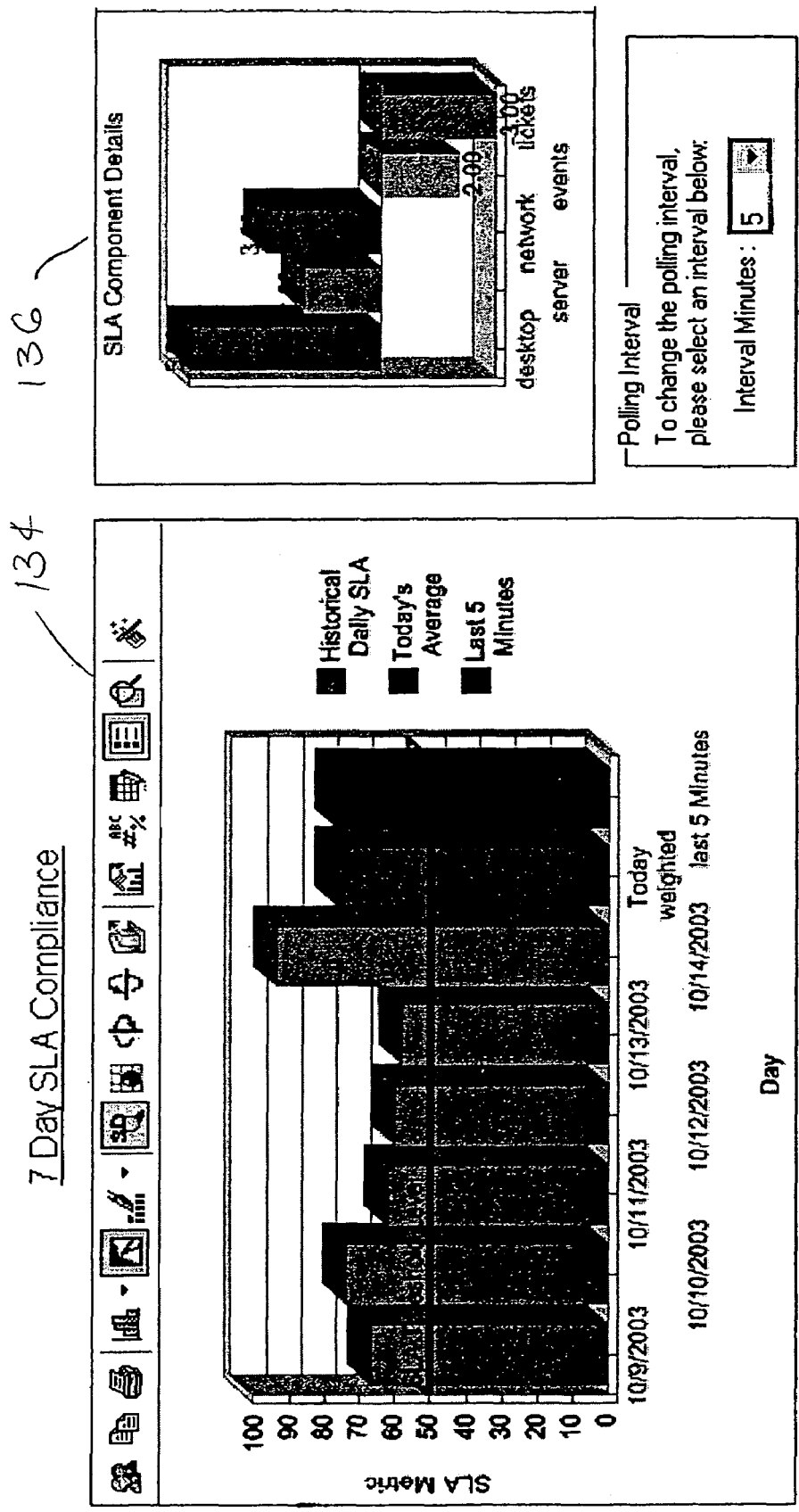
FIG. 9 shows a data processing system performance view according to an exemplary embodiment of the present invention.

Reference numeral 134 in FIG. 9 identifies a bar graph summarizing the Service Level Agreement ("SLA") compliance for the latest seven days of operation of the data processing system.

SLA compliance is a measure of performance of the data processing system. Usually, each end user of the data processing system has a Service Level Agreement which specifies the method or methods used to compute compliance, for the purposes of that contract. In general, however, SLA compliance is a function of the availability of the computer systems, the overall working condition or "health" of the "inventory" (computer systems) and the time required to respond to problems which may occur in the operation of the system. In the bar graph 134, "SLA Metric" is plotted vertically, and the day or date is plotted horizontally. The SLA Metric is a measure of SLA compliance.

The heavy horizontal line labeled "SLA Threshold Level" shows the minimum acceptable SLA compliance level. Individual bars indicate the compliance level for each of the past six days, as well as the current day, up to the minute, and a separate bar graph indicates compliance within the last five minutes.

SLA compliance computations usually include several different components, including, for the system shown in FIG. 1, SLA compliance for desktop units, servers, the network, service outage events, and trouble tickets. An individual bar graph is provided for each of these components in the bar graph section 136 of FIG. 9. As it is noted in FIG. 9, by clicking on each of the bars within the graph 134, one can view the SLA components shown in section 136.

The graphs in FIG. 9, and the icons 29 in FIG. 1 are developed with software 82 of FIG. 2, as well as other software described above.

The polling interval indicated in the section 138 of FIG. 9 allows the poling interval to be changed, if desired. For example, the polling interval can be changed from five minutes to one minute, or from five minutes to ten minutes, etc. This determines the intervals between re-computation of SLA compliance during each day.

The bar graphs shown in FIG. 9 give a manager a powerful tool for use in determining whether the very important goals of SLA compliance are being met by the system, and enable a manager to institute prompt corrective action, if necessary.

Typically, operating personnel also have access to the performance charts. However, the managers typically are not given access to the detailed data made available to the operators as described above, unless the manager establishes a need to see some of the other screens. Preferably, Microsoft "Active Directory" software is used to program the exceptions to the prohibition against managers gaining access to screens other than the end-to-end view and performance view.

FIGS. 10, 11, 12, and 13 show the numerous sources needed to provide the information for the bar graphs shown in FIG. 9.

Figure 10:
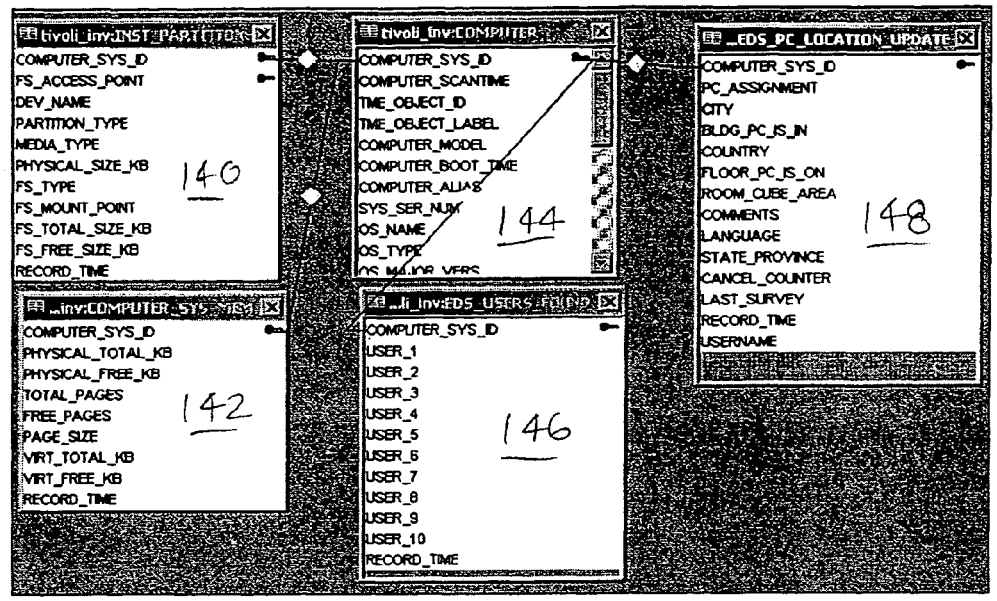
FIGS. 10, 11, 12, and 13 each show information sources from which information was taken to form the views shown in FIG. 9.

FIG. 10 shows five data sources 140, 142, 144, 146, and 148. Sources 140, 142, 144, and 146 are used to generate the desktop performance bar in chart 136, which consists of the number of service events for desk tops used in the system. Data source 148 is used to create the server bar in chart 136, that is, the number of open service tickets for servers in the network.

Figure 13:
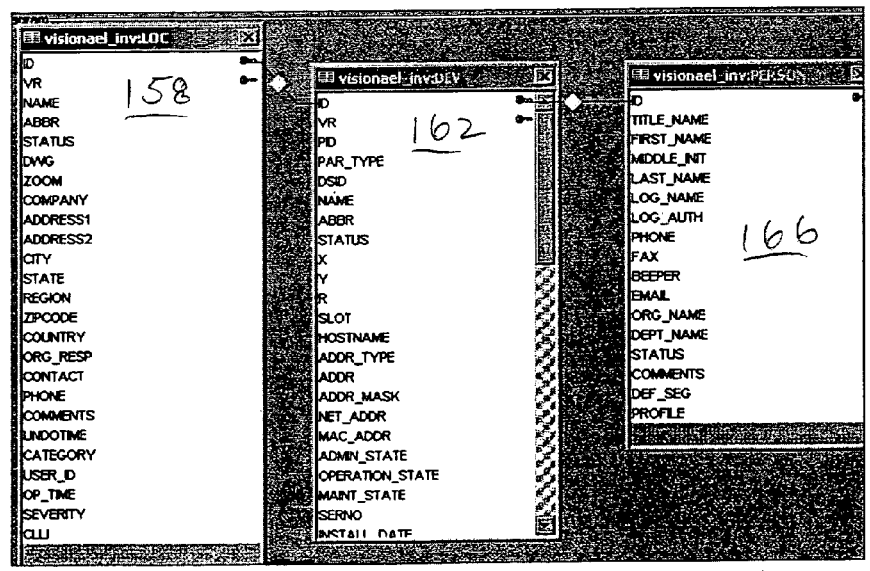

The information shown in FIG. 13 in areas 158, 162, and 166 is used to generate the bar in chart 136 indicating network performance.

Figure 11:
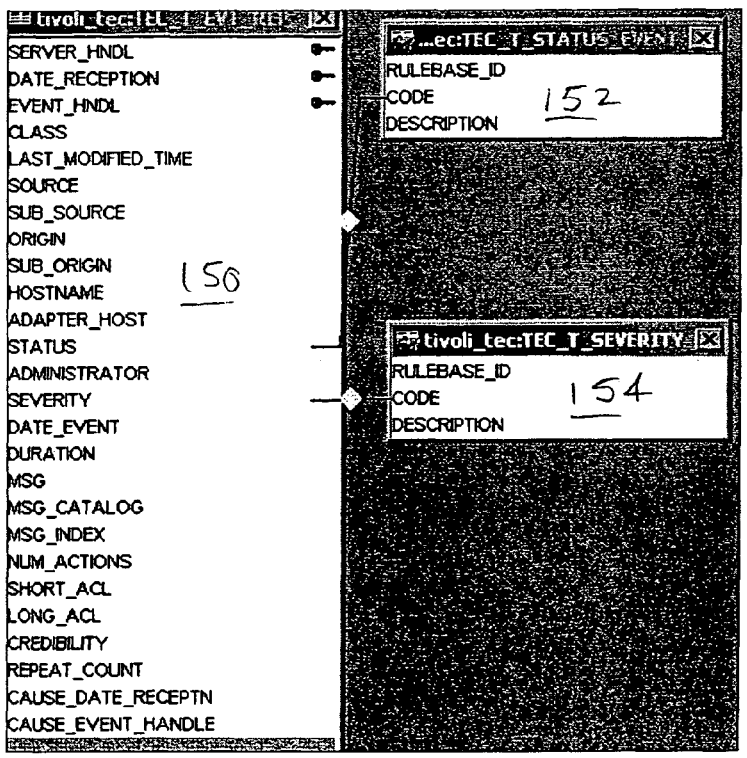

The information shown in areas 150, 152, and 154 of FIG. 11 is used to generate the network events bar in FIG. 9.

Figure 12:
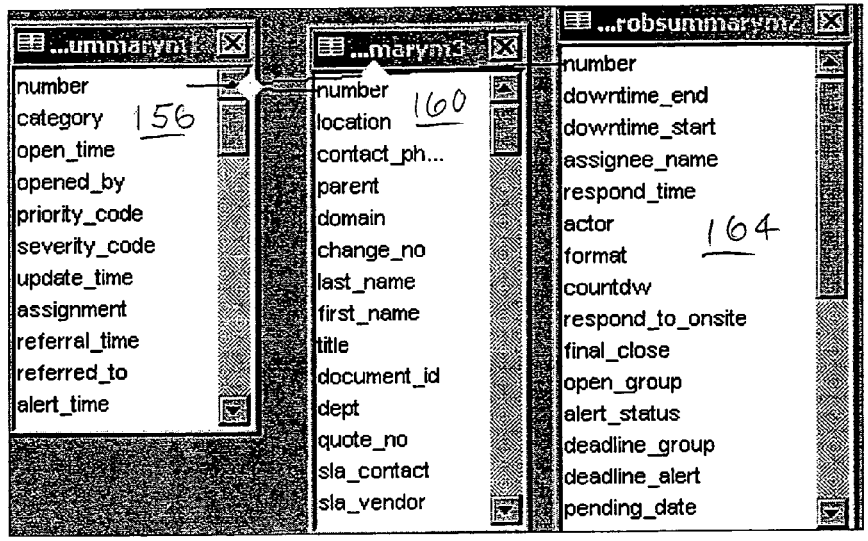

The information in areas 156, 160, and 164 of FIG. 12 is used to generate the trouble tickets bar for desktop performance in chart 136 of FIG. 9.

Figure 13A:
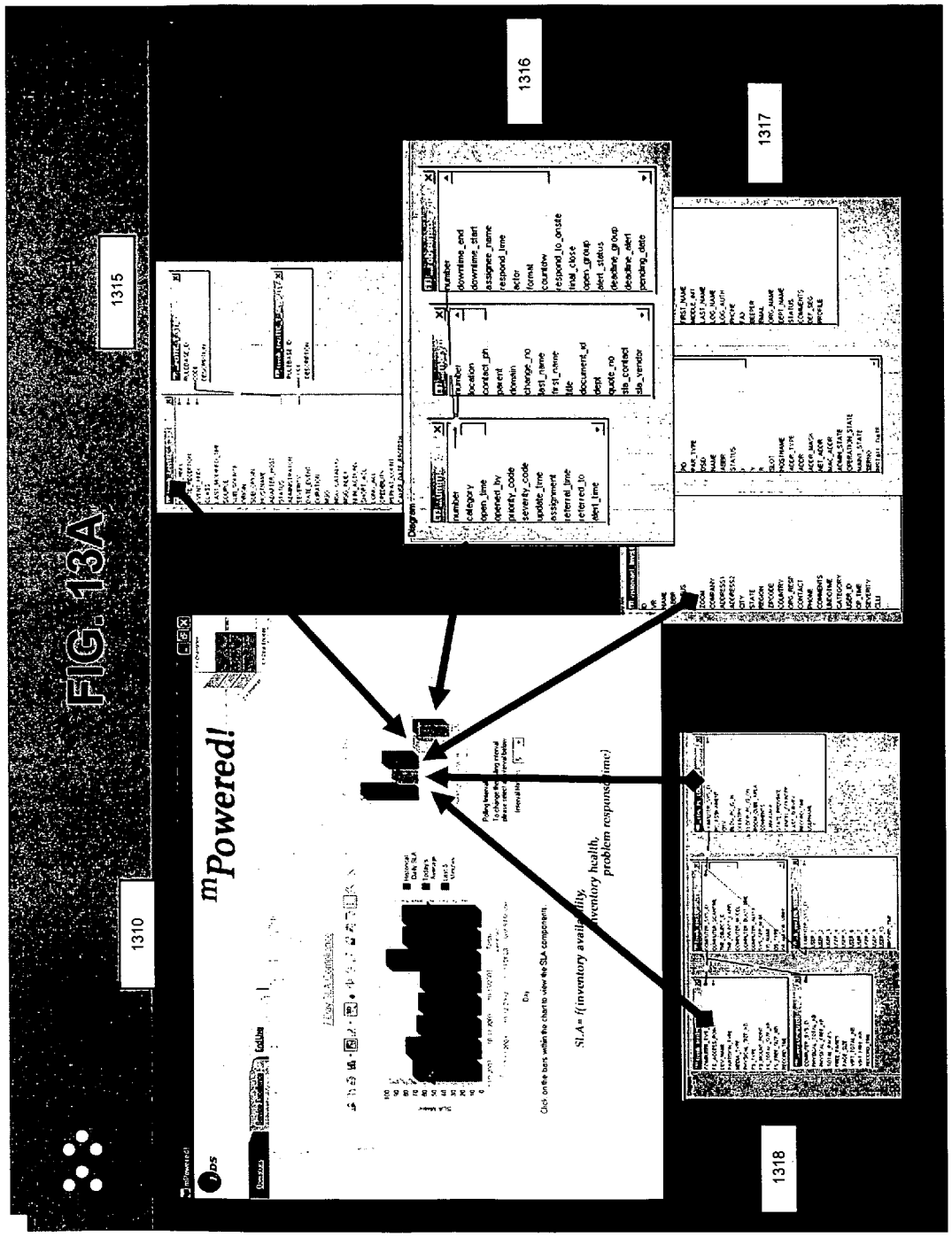
FIG. 13A illustrates the connections between the data sources of FIGS. 10-13 and the system performance view of FIG. 9.

FIG. 13A provides a summary of the relationship between the data source screens of FIGS. 10-13 and screen 136 of FIG. 9. Thus, with reference to FIG. 13A, data source screens 1318, 1315, 1316 and 1317, correspond to the screens of FIGS. 10, 11, 12 and 13, respectively, and thus provide the data for the bar graph of screen 136 of FIG. 9, shown in color at 1310 of FIG. 13A.

The information in areas 156, 160, and 164 of FIG. 12 is used to generate the trouble tickets bar for desktop performance in chart 136 of FIG. 9.

Alternative Asset Summary View

Figure 14:
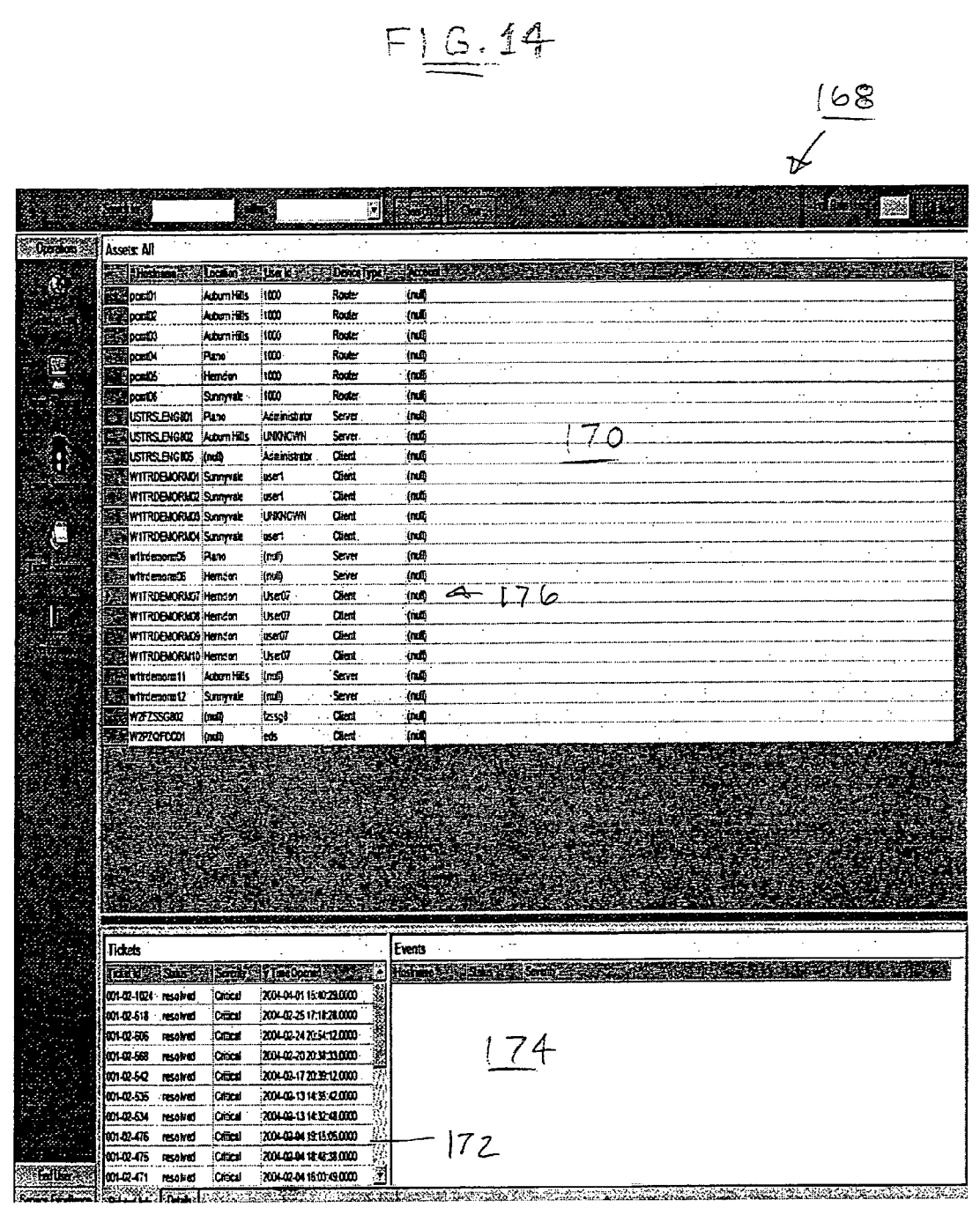

FIG. 14 shows an asset summary view different from the one shown in FIG. 7. The screen 168 includes an asset list in the area 170, and has areas 172 and 174 in which trouble tickets and events can be listed for selected ones of the assets.

In the asset list 170 the name of the equipment is listed in the first column, its location in the second column, the user ID in the third column, and in the fourth column the device type is listed. The device type includes router, server, client device, etc. The list shown is by way of example and typically would be a long list to which access could be gained by scrolling up or down.

The detailed information for a selected one of the assets can be displayed in the areas 172 and 174 by clicking on the asset in the list 170. For example, the asset 176 has been clicked on and the trouble tickets for that asset is listed in area 172.

By means of the custom view 168, the operating personnel can quickly and easily check the recent operating health of each asset in the system.

As with other custom views described herein, the asset list, trouble tickets and events information have been gathered from the CSM equipment 74 by use of the broker 72 to consolidate, transform into a uniform format, and reduce the quantity of information into a compact, efficiently usable form.

End User View

Figures 15, 16:
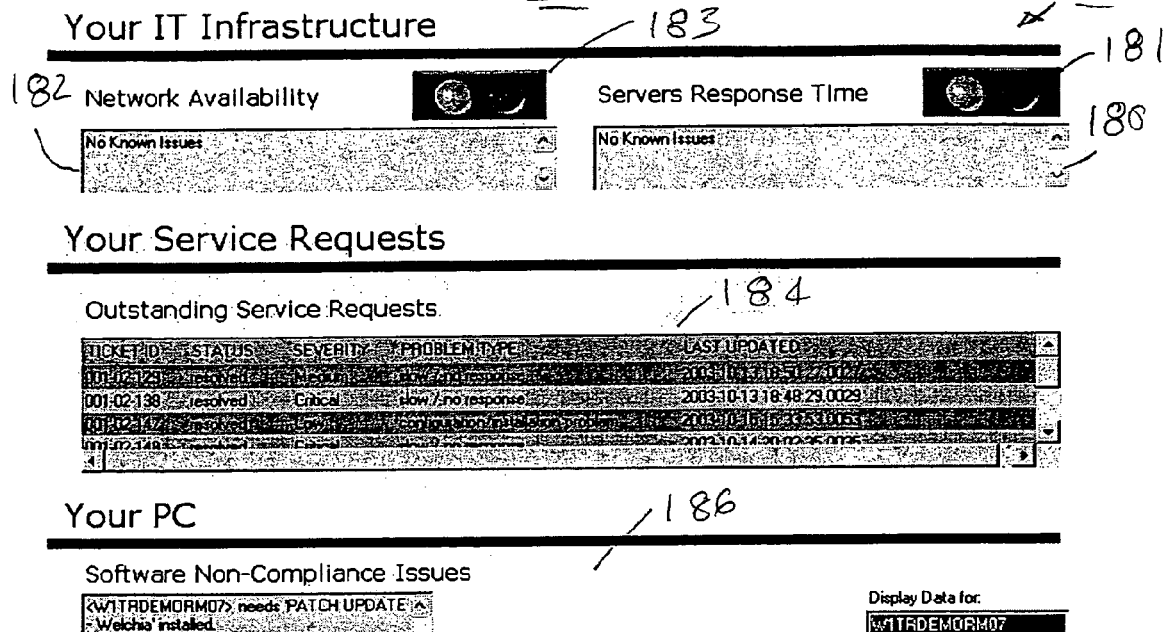
FIG. 15 shows an exemplary end-user view of a data processing system according to an exemplary embodiment of the present invention.
FIGS. 16, 17, and 18 show information sources from which information was taken in developing the view shown in FIG. 15.

FIG. 15 shows the end user view which can be accessed by data processing system operational personnel by selecting the end user button 48 shown in FIG. 1.

The end user personnel can access the screen shown in FIG. 15 on the end user's own terminals located on its business premises. Such terminals can either be "thick client" or "thin client"—that is, either simple terminals primarily for information display (sometimes known as "dumb terminals"), or "smart" terminals such as personal computers or work stations with much more logic and data processing capabilities of their own.

At the option of the end user and the service provider, the end user also can be given access to some or all of the other views described above. However, in accordance with one of the principles of the invention, such information undoubtedly would be far more than each individual end user would need, and, therefore, would not be made available to every end user.

The screen 178 shown in FIG. 15 includes an area 180 for reporting on the response time of the servers used to provide services for that end user, and another area 182 to report on network availability to that end user. Two sets of status lights 181 and 183 show either a green light or a red light, green indicating satisfactory operation, and red indicating unsatisfactory operation of the respective equipment for which the status is shown.

A table 184 is provided reporting on outstanding service requests and their status.

An area 186 reports on software non-compliance issues for the end users personal computers.

Thus, the end user screen 178 provides the end user with ample information to quickly determine the operational status of the system used for its data processing. At the same time, the provision of excess information of no interest or need to the end user is avoided.

Figure 17:
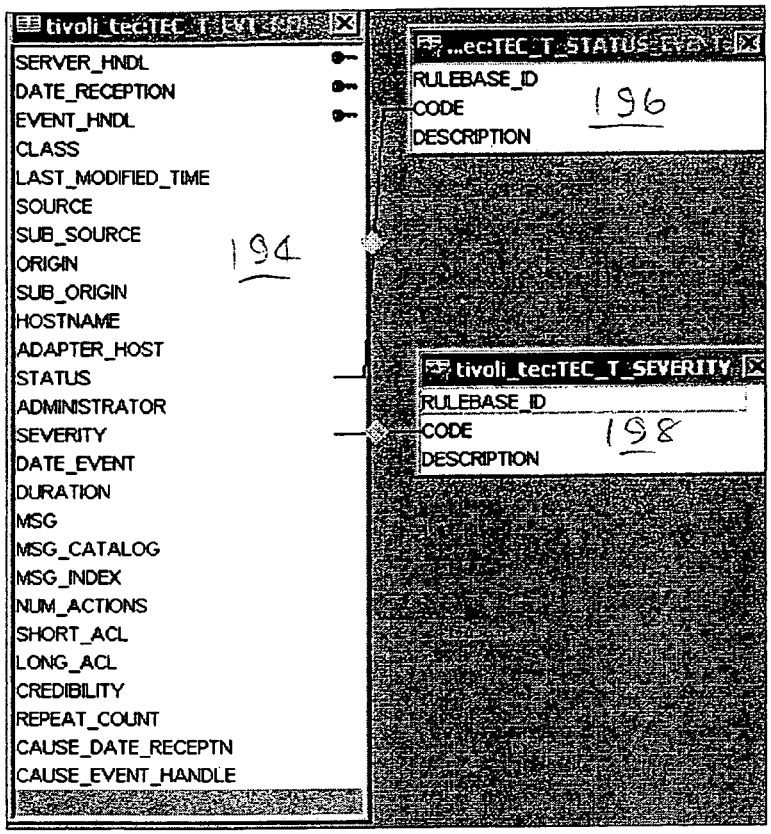
Figure 18:
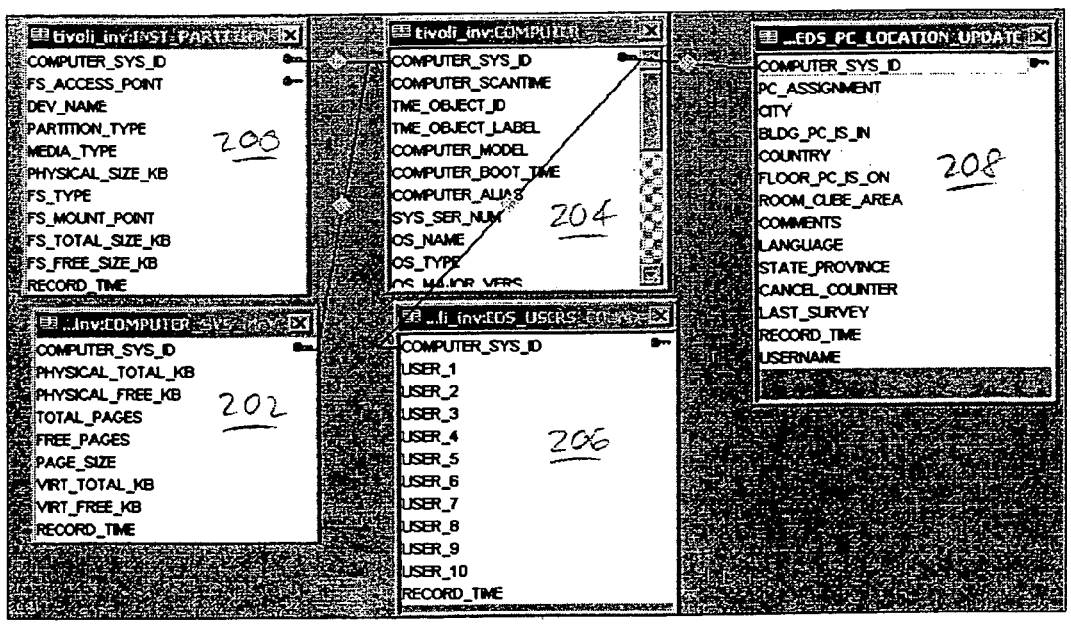

FIGS. 16, 17, and 18 illustrate the sources from which information was obtained in creating the screen shown in FIG. 15.

FIG. 16 shows three areas 188, 190, and 192 from which information was taken in creating the outstanding service requests portion of the screen 178.

FIG. 17 shows data from three different sources as indicated at 194, 196, and 198 used to prepare the information provided in areas 182 and 180 of the screen 178.

Figure 18A:
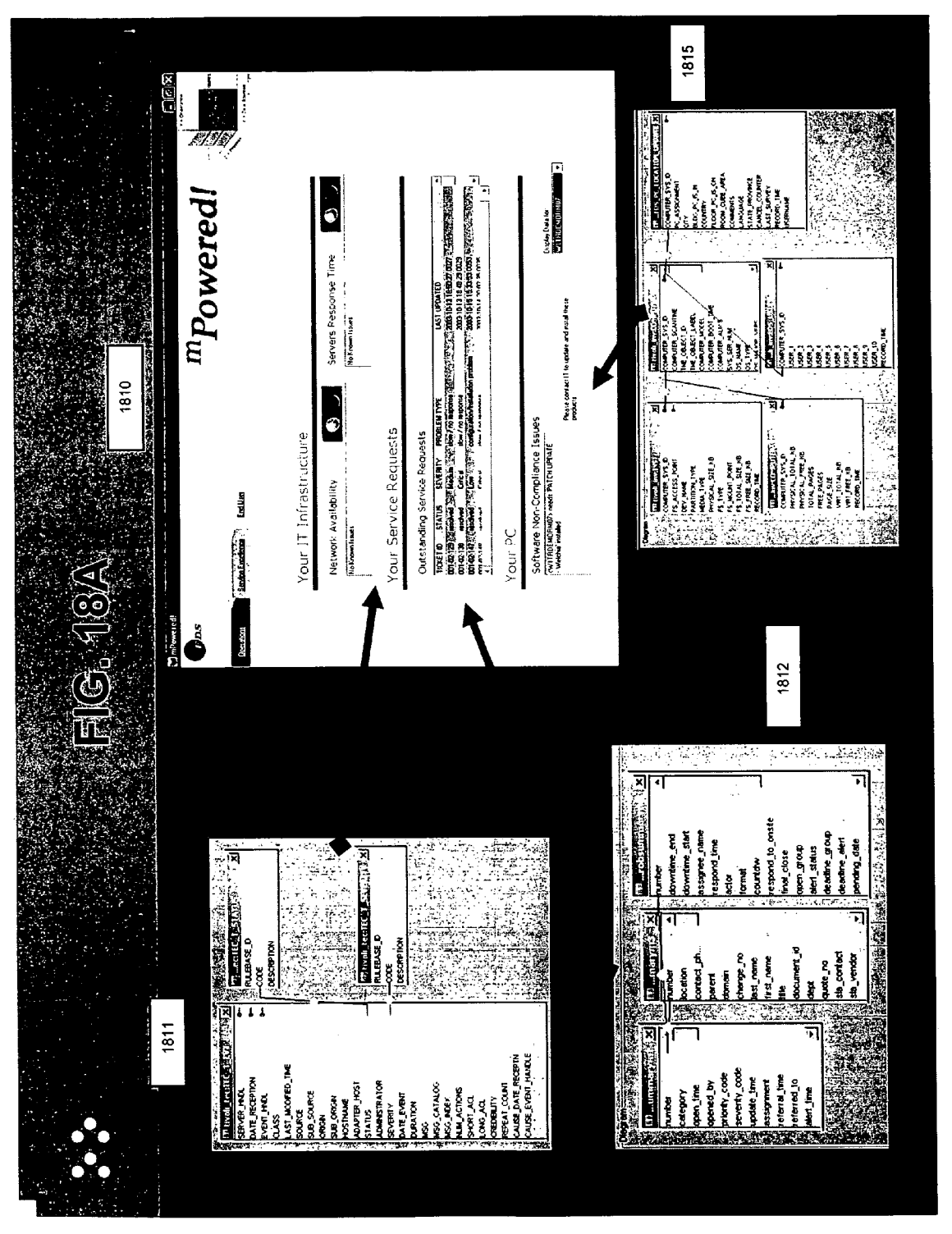

FIG. 18 shows information in five areas 200, 202, 204, 206, and 208 from which information was taken in preparing the "your PC" section of the view 178 in FIG. 15. FIG. 18A shows the relationship between the respective data source screens of FIGS. 16-18 in creating the screen of FIG. 15. Thus, with reference to FIG. 18A, at 1810 an exemplary screen shot similar to that of FIG. 15 is depicted. Additionally, screens 1811, 1812 and 1815 respectively correspond to those of FIGS. 16, 17 and 18.

Views for Other Roles

Figure 19:
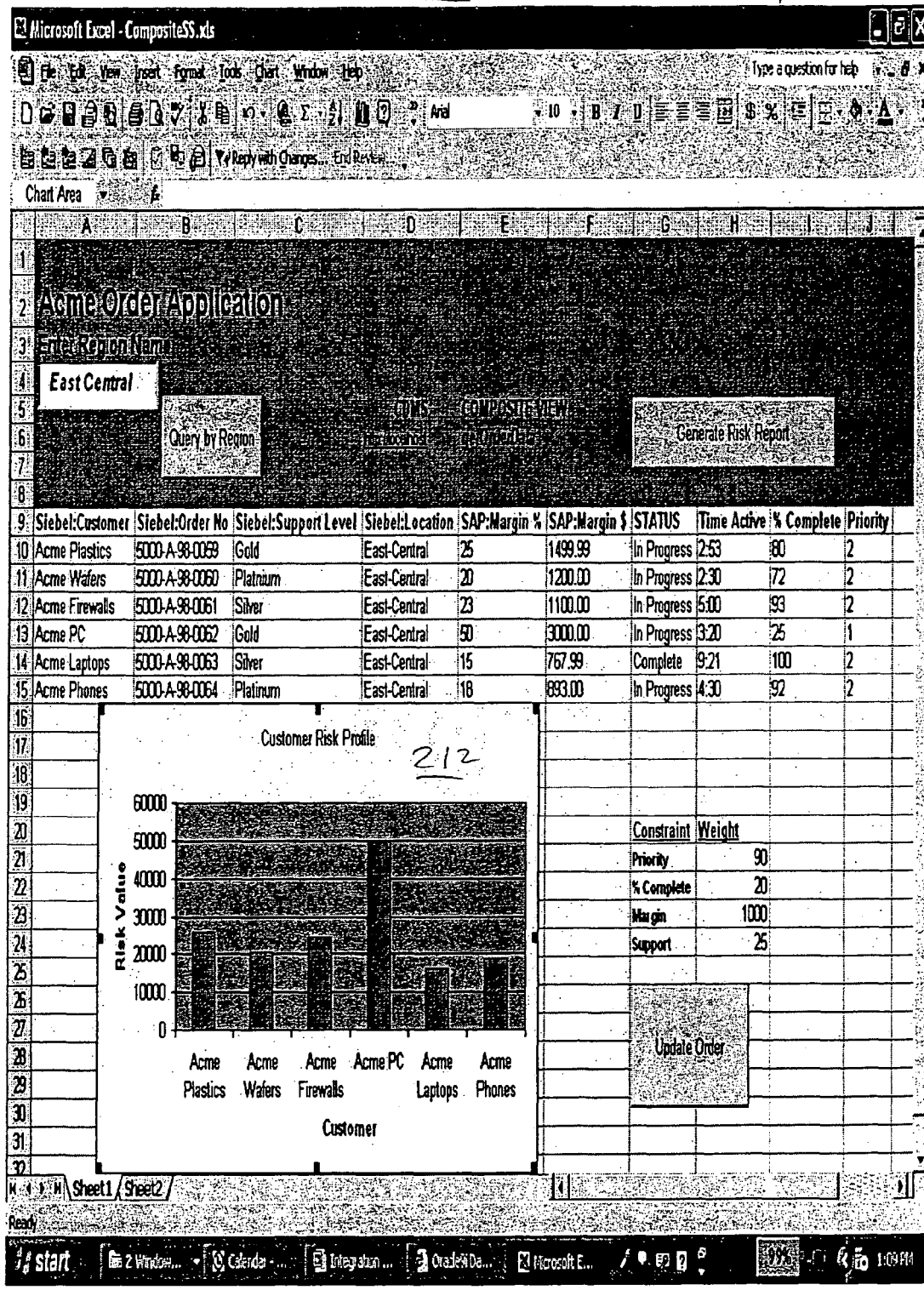
FIG. 19 shows an exemplary customer management screen that can be provided to business or other organizations according to an exemplary embodiment of the present invention.
Figure 21:
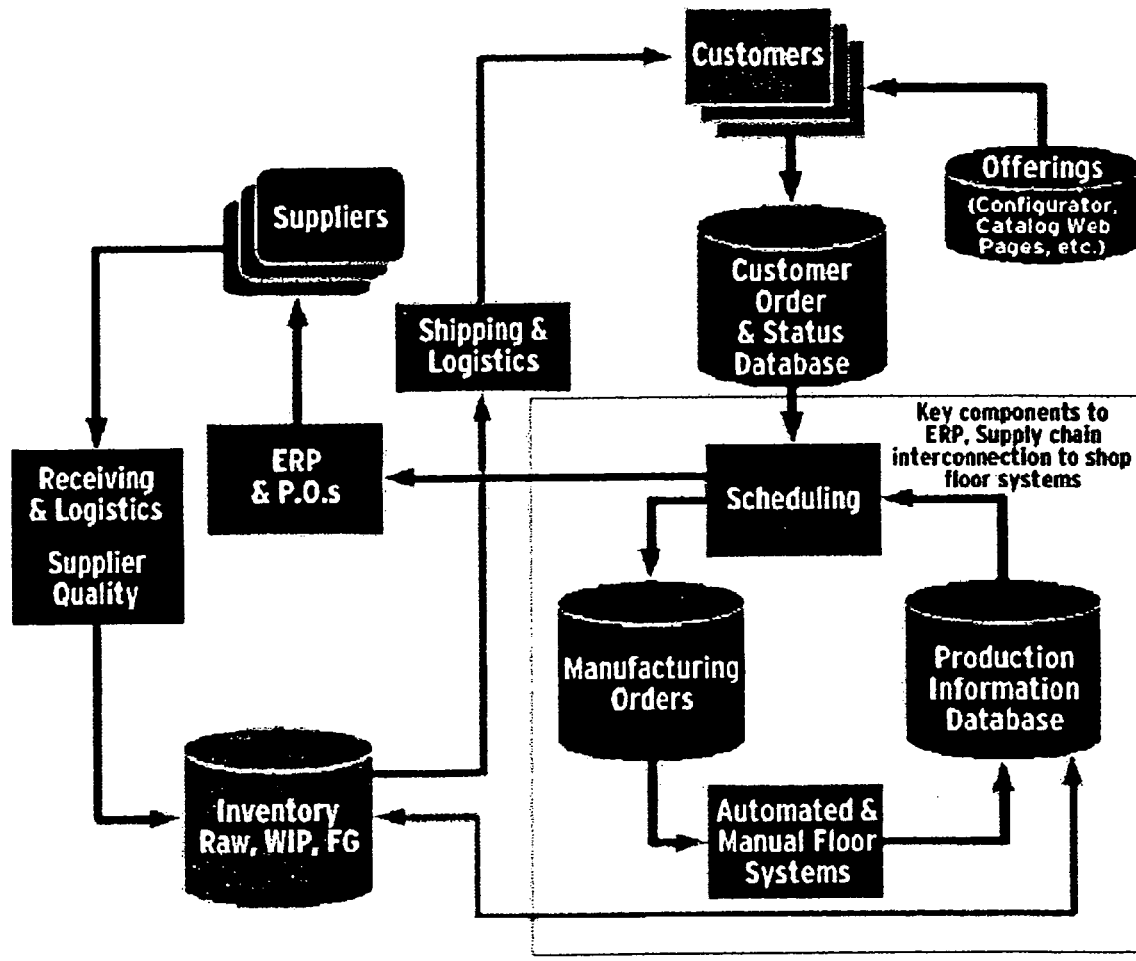
FIG. 21 shows an example of manufacturing production planning views that can be businesses or other organizations according to an exemplary embodiment of the present invention.

FIGS. 19, 20, and 21 show three examples of the many different views that can be provided in accordance with the invention for aiding various business activities. As with the foregoing examples, each view is custom made for a person filling a certain role in the organization.

Role-based software in accordance with the invention either can be used by a data processing system provider for use by the end users, or can be supplied as stand-alone software to be installed and used internally within an organization. However, it is preferred to use it in a network in order to make use of the off-site storage and computing capacity which is available by that means.

Following are some examples of the views provided by such software.

Customer Relations Management

FIG. 19 shows a custom screen designed for use by a customer relationship manager. In accordance with the invention, information from a variety of different business information sources 78 (FIG. 2) are extracted to produce a concise view giving operations personnel just enough information that they need in dealing with customers and enabling them to make prompt decisions.

FIG. 19 gives an example of a report for a fictitious company called "Acme". Acme has several products which are displayed in a customer risk profile chart 212 on the screen 210.

Elsewhere in the screen 210 appears other information taken from different sources. For example, information in the first four columns is taken from data generated by standard business information software which already may be in use by the end user. This is the software labeled "Business Information Sources" 78 in FIG. 2.

Various figures useful to the customer relations manager in determining whether to accept the order application from Acme are given elsewhere in the screen 210.

Financial Management Views

FIG. 20 is an example of custom financial management views which can be used by various financial officials of an organization. A screen is shown entitled "Working Capital Management", and includes information at 214 on yield rates for CDs of various terms. Also, CD purchase schedules are listed at 216, and interest earned over a certain period of time is listed at 218.

A chart is provided at 220 giving a schedule for cash flow management so as to insure maximum earnings on spare cash without creating cash shortages.

The screen shown in FIG. 20 is composed of information gathered from a number of different business information sources and assembled by the broker 72 and other hardware and software shown in FIG. 2 sources.

As with the other role-based screens provided above, the financial manager is provided with just enough information to perform the task at hand. If needed, he can still have access to detailed information by way of views shown on the CSM screens 76 (FIG. 2).

Role Views for Manufacturing Industries

FIG. 21 shows just one example of a custom screen which can be provided to various management or engineering personnel to assist them in their functions in running a manufacturing company. The particular screen shown is a process flow chart for the manufacturing process in a particular business.

Such a screen might be useful to a number of different management personnel such as a plant manager, production foreman or quality controller. Again the information necessary to create the custom view for each of those personnel can be derived from business information sources 78 (FIG. 2).

Each role can have one or a set of different custom screens from which extraneous material has been eliminated and relevant information has been gathered from a number of sources by the equipment and methods illustrated in FIG. 2 of the drawings.

FIG. 21A depicts a color version of the screen of FIG. 21, and also illustrates various exemplary views that are possible as a function of the role of the viewer within the organization or entity. Thus, for example, views can be customized for a plant manager 2101, a production foreman 2102, or a quality controller 2115. Additionally, FIG. 21A also illustrates how an exemplary system according to the present invention can draw on various data sources throughout the entity, as well as provide data t these components. This is illustrated by the interaction (two way arrows) between the system in the center and various data centers within the entity at 2120.

Programming

The programming necessary to perform the functions and create the screens, and data flows described above are well within the skill of the art to perform.

In particular, "Microsoft.Net Studio" framework programming language can be used together with the software in Broker 72 to extract information and assemble it into screens which have a consistent format.

Example

A Generic Application Adapter for Simplifying Enterprise Application Integration As noted above, Broker 72 (FIG. 2) can include EAI software. The following example describes exemplary EAI software in the form of a generic application adapter which can be used, according to exemplary embodiments of the present invention, to facilitate threading data and information between and among applications that have different non-conforming protocols and semantics.

Growing trends within information systems (IS) environments emphasize IS service visibility and awareness to reduce support costs and improve reliability. Towards this end, a series of activities can be launched to integrate and manage information and management systems that monitor and control components of delivery system resources.

A Generic Application Adapter can seek to fulfill three principal goals: (i) simplify the complexity in developing adapters to programs and computing resources; (ii) develop self-describing application adapters, which reduces labor intensive and error prone task of event registry and mapping; and (iii) establish a common hierarchy relative to SLA Management Services and Proactive Support Systems created in support of end-to-end management. The following describes an exemplary approach to implement these principles.

Application Adapter Development—Abstracted Simplification

Perhaps the biggest challenge facing enterprise management users is the lack of integration between various management tools, frameworks, and traditional information systems (IS) applications. Industry has answered with a myriad of middleware and integration software options that require subject matter experts build, deploy, and sustain. Ironically, the solutions have created greater complexity and skill demand deficiencies within the IS industry at large.

To address these integration issues, in exemplary embodiments of the present invention a generic adapter to a specified Enterprise Application Integration (EAI) technology can be created. EAI is a relatively new middleware classification specifically created for middleware products whose intention is to thread data and information between and among applications that have different non-conforming protocols and semantics. The generic adapter approach is rather straightforward, focusing EAI expertise on developing controlled input/output interfaces to specific EAI implemented technology and exposing the general-purpose semantics.

General Application Adapter Architecture

Figure 22:
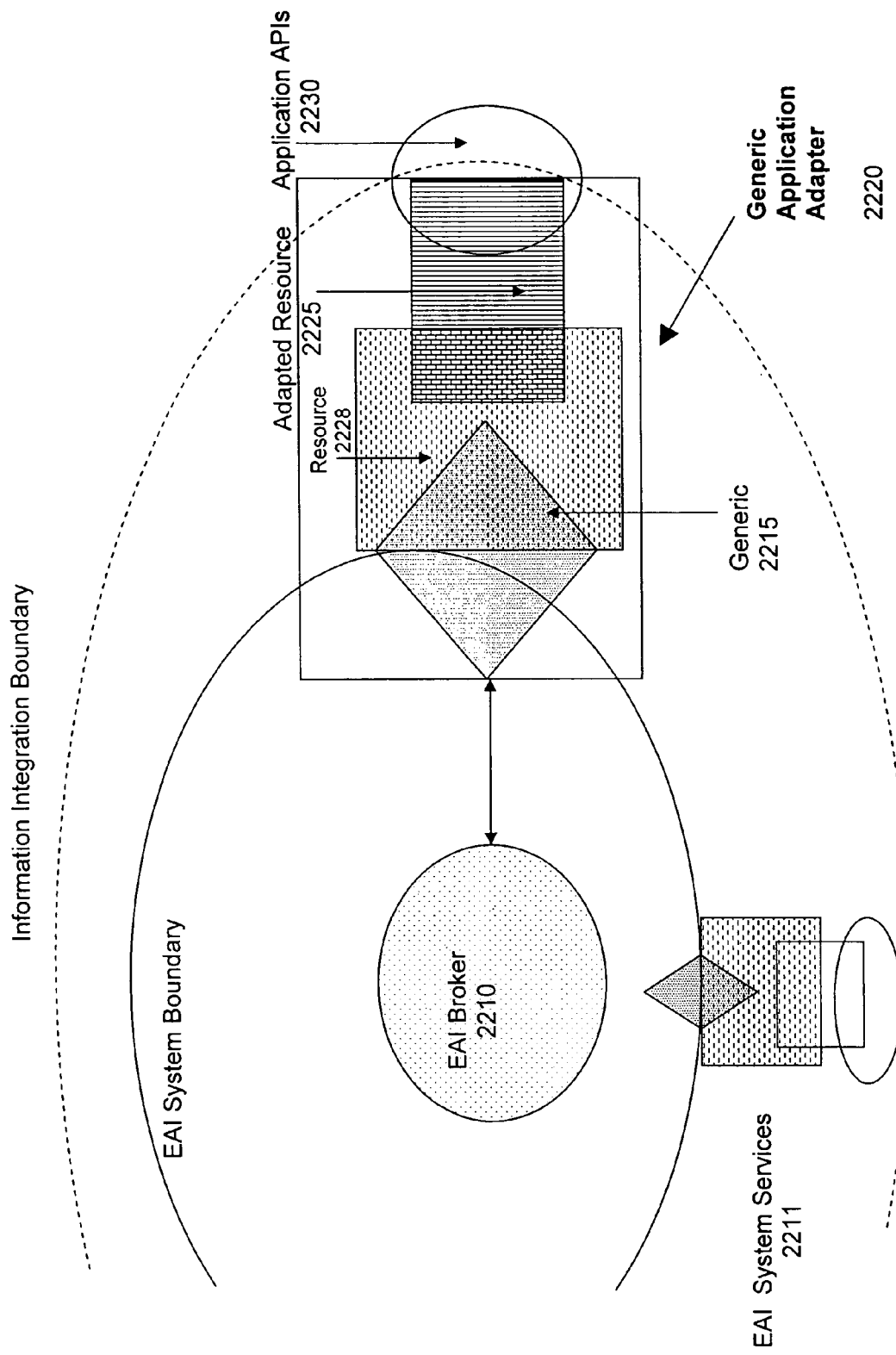
FIGS. 22-27 illustrate an exemplary version of EAI software according to an exemplary embodiment of the present invention.

FIG. 22 illustrates an exemplary application adapter in context of exemplary overall event integration architecture.

A Generic Application Adapter 2220, at runtime, can consist of three object instances:

AdaptedResource 2225—The AdaptedResource 2225 can comprise of Java wrappers for all C API 2230 calls whose Java Classname is identical to the Generic Resource that contains it. If the adapted application does not support C API calls then an additional wrapping function can be performed to standardize on C API calls.

Resource 2228—This class bridges the semantics of the specific EAI system to the semantics of the application being adapted. Resource contains an instance of Generic and an instance of AdaptedResource. At Resource startup the Generic Resource is named by the specific EAI system.

Generic 2215—is the Adapter's type as defined by the specific EAI system and represents the set of behavioral expressions expected from a typical generic application adapter.

The benefit of this approach enables the Specific AdaptedResource 2225 subclass to be the only piece of new code generated for incorporating applications into the specific EAI system.

Figure 23:
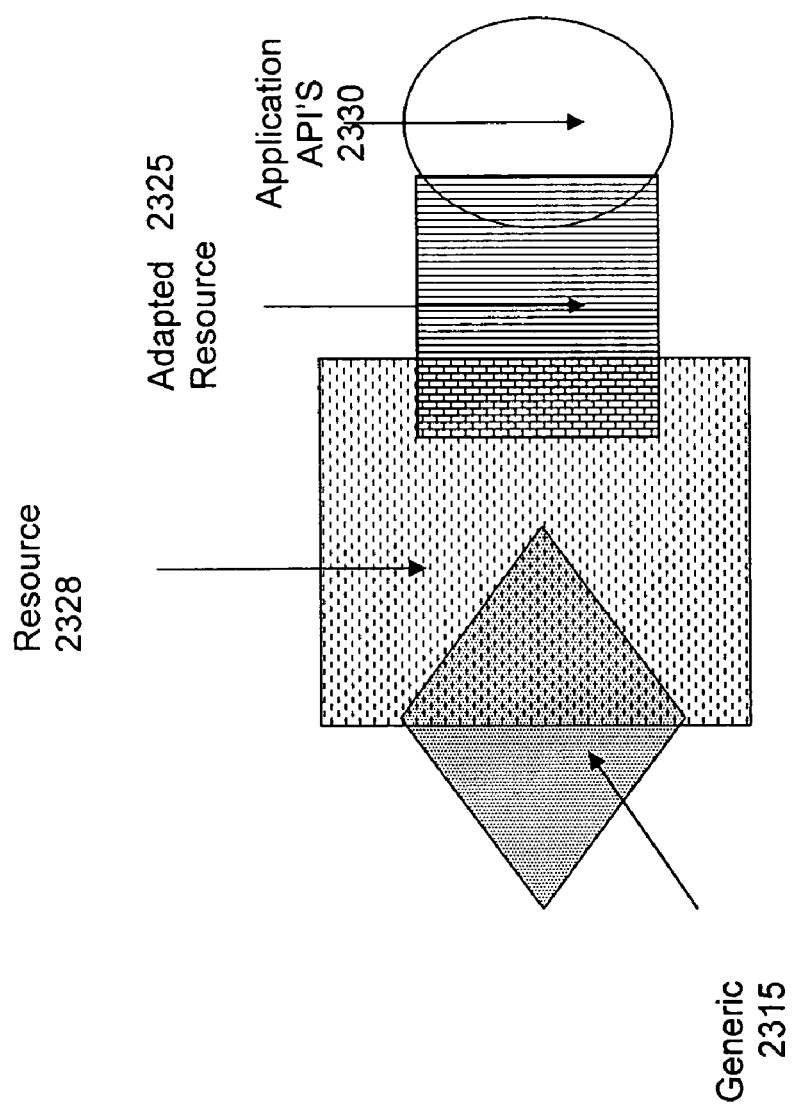

FIG. 23 depicts a Generic Application Adapter by itself, showing the Application APIs 2330, an Adapted Resource 2325, a Resource 2328 and a Generic 2325.

Specific Details of a Generic Application Adapter

This following will describe specific layers, from the inside out, of an exemplary Generic Application Adapter. Exemplary code fragments are included for to assist in clarifying concepts and ideas.

Broker-Adapter Protocol (BAP)

Figure 24:
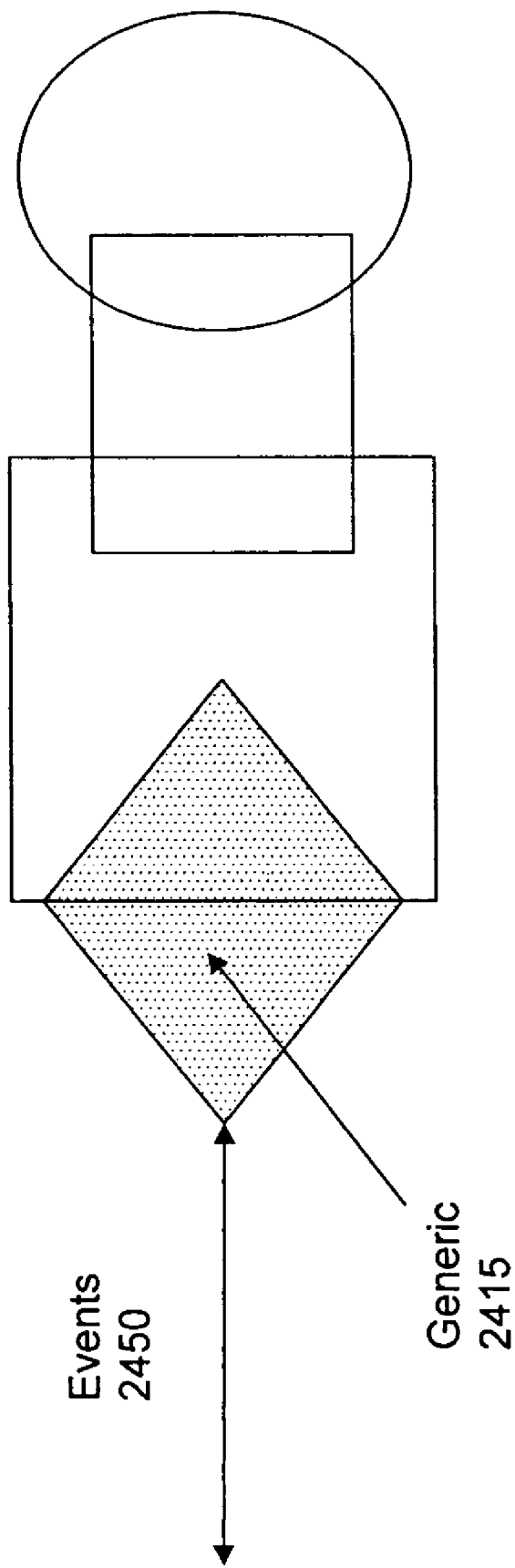

An abstract setupEvent( ) method of general class Adapter can, for example, be implemented in the subclass Generic 2415 (FIG. 24). A Generic setupEvent( ) method can, for example, examine each AdapterEventType instance to determine the kind of semantic operations that are supported for Event 2450 (FIG. 24) occurrences during runtime. Four fundamental semantics in BAP can, for example, be:

Consumer—A Consumer subscribes to particular published Events;

Consumer/Producer—A Consumer/Producer replies to the receipt of a subscribed request Event;

Producer/Consumer—Producer/Consumer requests a behavior of some other resource in the system, and awaits one or more reply Events; and Producer—A Producer publishes new Events, either synchronously or asynchronously.

Additionally, runtime thread support for each semantic can be provided by the Resource class.

AdaptedResource

A Specific AdaptedResource 2525 (FIG. 25) subclass can, for example, be abstracted into one of six semantic types, as follows, and mapped back to SBAP:

exec( )—as a Consumer, the application can be simply commanded to "do something." This is the simplest semantic, and there is no expectation of a return value;

reply( )—as a Consumer/Producer, the application can be asked to "do something", and respond with information about what has been done;

transform( )—as a Consumer/Producer, the application can subscribe to a particular Event by a Resource class; information contained in the Event, when received, can be passed to and operated on by the adapted application; upon return of operation, a new, possibly different Event can be published with fields initialized from the data contained in the SemanticInfo argument;

await( )—as a Producer, the application can be expected to report status, asynchronously, at some time in the future; this semantic can block until status or result is returned; the returned information can be placed into the published Event fields;

request( )—as a Producer, the application asks that some other resource "do something"; the returning semantics, either immediately or after unblocking, can deliver the information needed for the published request Event fields; and report( )—as a Producer, the application is expected to report on all happenings since the last report; the returning semantics are immediately, with one or more information blocks, depending on how what has happened since the last report.

These design patterns can, for example, be formalized in Java, in the public interface of an AdaptedResource class:

```
public class AdaptedResource{
    public void exec(SemanticInfo details);
    public Enumeration getExecSemantics( );
    public void reply(SemanticInfo details);
    public Enumeration getReplySemantics( );
    public void transform(SemanticInfo details);
    public Enumeration getTransformSemantics( );
    public void await(SemanticInfo details);
    public Enumeration getAwaitSemantics( );
    public void request(SemanticInfo details);
    public Enumeration getRequestSemantics( );
    public void report(SemanticInfo details);
    public Enumeration getReportSemantics( );
    public void init(String nativeLibName);
}
```

The argument to the semantic methods can, for example, be contained within an instance of the SemanticInfo class with further details located within container SemanticInfo details. SemanticInfo details can describe the information, which the adapted application either receives or sends. Each piece of information can be, for example, a field, with a label, a type, and a value. A descriptive label can be created by a programmer adapting the application into the specific EAI system. The label can be used in the Event registration manager to create an association and sequencing between particular Events and behaviors within a specific EAI system.

Resource Establishes the Semantic Bridge

Figure 25:
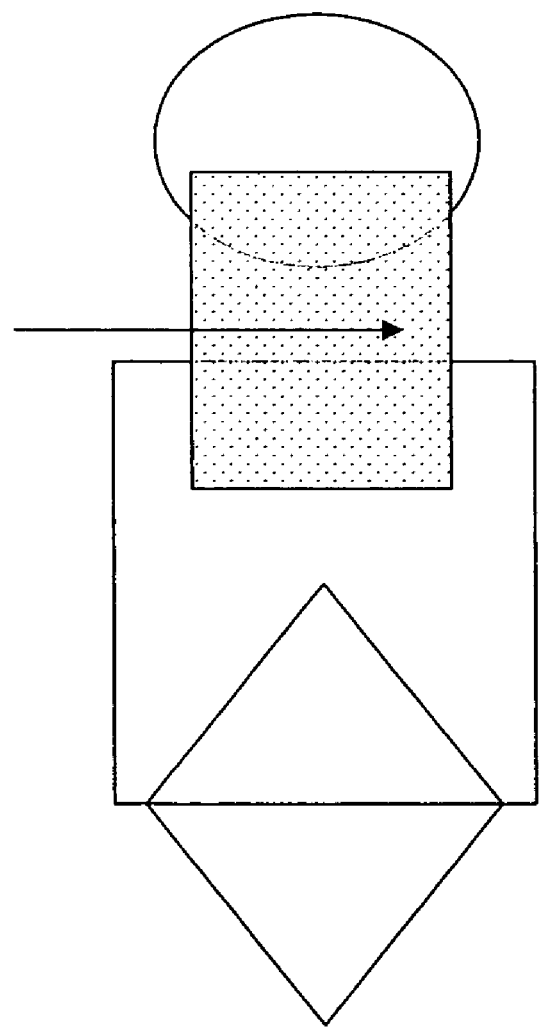
Figure 26:
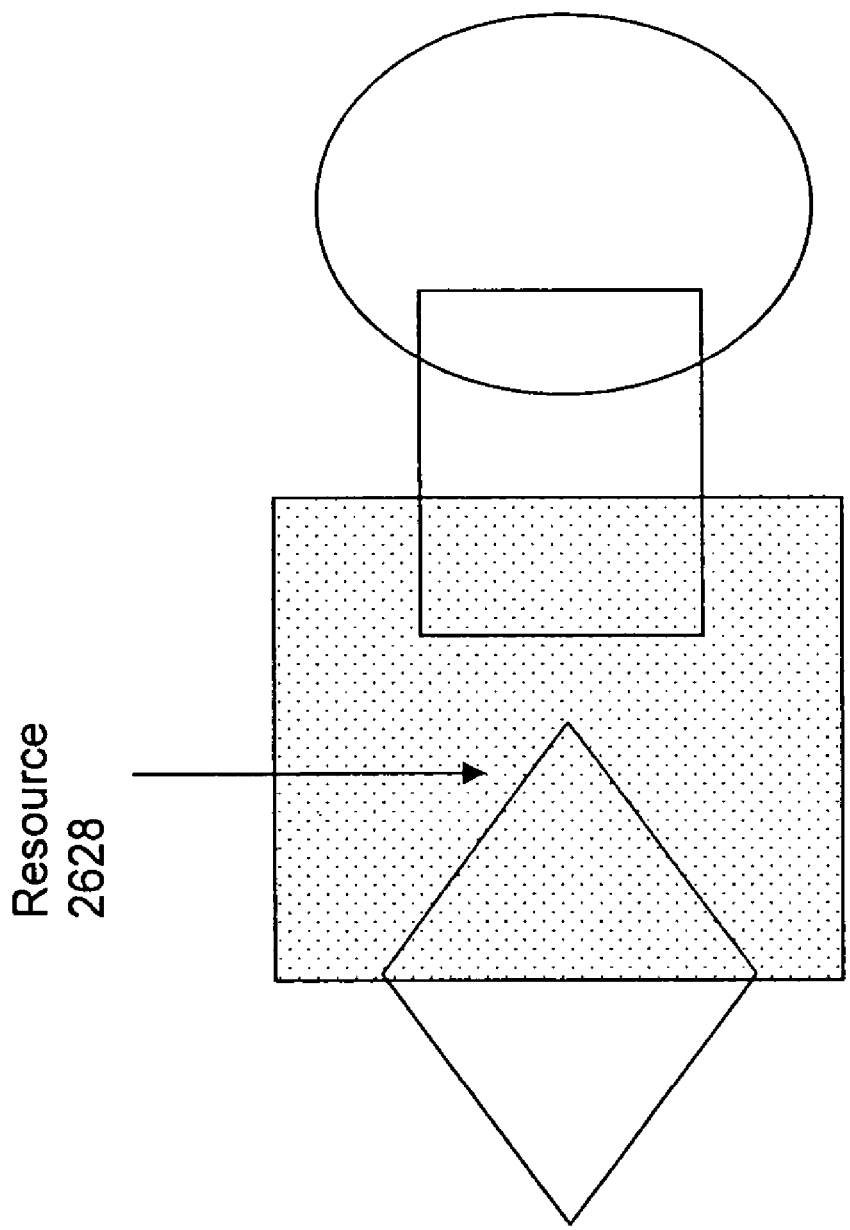

The Resource 2628 (FIG. 26) class can be, for example, the semantic bridge between a specific EAI System and an AdaptedResource. The BAP semantic for an Event can thus determine the kind of control flow imposed upon calls to the AdaptedResource 2525 (FIG. 25).

| Broker-Adapter Protocol (BAP) | AdaptedResource |
| --- | --- |
| Consumer | exec( ) |
| Consumer/Producer | reply( ) |
|  | transform( ) |
| Producer/Consumer | request( ) |
| Producer | await( ) |

The Resource 2628 can, for example, spawn a thread of control appropriate for each configured Event/Semantic pair. If the Resource's role is as a Consumer or Consumer/Producer, it can, upon receipt of the Event, thread into the Specific AdaptedResource, presenting the thread with the Event's embodied information. If the Resource's role is as a Producer, it can first thread into the AdaptedResource. The thread can then either block, or return immediately, based upon the AdaptedResource's native semantics. Upon return, the thread can transform native AdaptedResource information into the appropriate fields of an Event, and then publish that Event to the specific EAI System.

Application Adapter Discovery and Registration

A newly spawned Generic Application Adapter can, for example, discover its event relationships. Event relationships within the specific EAI system are called Registration Information Sets. A New Application Adapter can, for example, query a specific EAI System, which can then, for example, scan the set of configured Events and identify each of the Registration Information Sets that matches the Adapter's runtime-specified type and name and transmit them to the adapter.

Applying the Generic Application Adapter to Services

Figure 27:
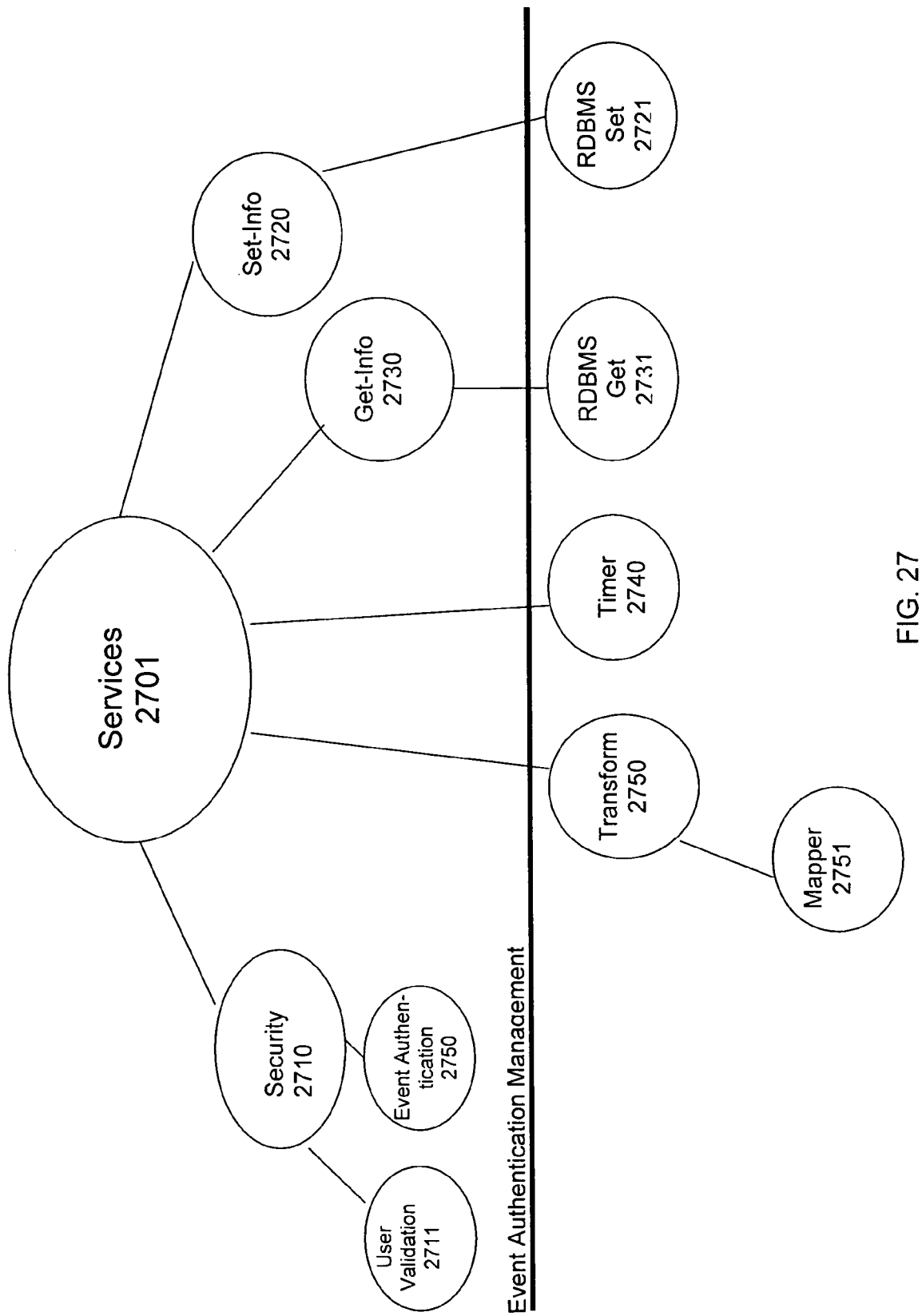

Services are building blocks of logic that enable events, data, and logic to be processed within a specific EAI system. All services developed can, for example, make use of the Generic Application Adapter to converse with clients and resources within the specific EAI system. An exemplary high-level hierarchical service structure is depicted in FIG. 27, next described.

Security 2710

Services of this class will, for example, be concerned with validation 2711 and authentication of operations 2750 done by other services. Exemplary coding conventions can be as follows:

---
security::user-validation::<parent classes>::<sub-classes>::<etc.>
security:event-authentication::<parent classes>::<sub-classes>::<etc>
---

Get-Info 2730

This category of services can be responsible, for example, for fetching read-only data from data sources 2731. Security authentication checks can be performed for each operation. Exemplary coding conventions can be as follows:

---
get-info::rdbms-get::<parent classes>::<sub-classes>::<etc.>
get-info::data-get::<parent classes>::<sub-classes>::<etc.>
---

Set-Info 2720

This class of services can, for example, be responsible for inserting and or updating data into data sources 2731. Security authentication checks can be performed for each operation. Exemplary coding conventions can be as follows:

---
set-info::rdbms-set::<parent classes>::<sub-classes>::<etc.>
set-info::data-set::<parent classes>::<sub-classes>::<etc.>
---

Transformation 2750

Services of this class can, for example, be responsible for taking input and performing a Get-Info to fetch data, and then publishing a new event or taking a input and reformatting the data then publishing the result in a mapper 2751. Exemplary coding conventions can be as follows:

---
transform::mapper::<parent classes>::<sub-classes>::<etc.>
---

Timer

Services of this class can, for example, be responsible for time qualifications relative to data published and subscribed to within the specific EAI system. Exemplary coding conventions can be as follows:

---
timer::<parent classes>::<sub-classes>::<etc>
---

The above description of the invention, including the exemplary EAI software described in the example (Generic Application Adapter) is intended to be illustrative and not limiting. Various changes or modifications in the embodiments described may occur to those skilled in the art. These can be made without departing from the spirit or scope of the invention.

What is claimed:

1. A method of monitoring the provision of data processing services, said method comprising:
    monitoring one or more portions of a data processing services system using monitoring devices to determine whether terms of a service level agreement are met for a plurality of end users, each monitoring device having a corresponding application adapter instance, and at least some of a plurality of applications includes non-conforming protocols and semantics;
    each corresponding application adapter instance including:
    an instance of a reusable generic interface, with each generic interface providing uniform communications between the application adapter instance and an information broker in a type defined by the information broker;
    software specifically configured to adapt communications with the monitoring device to communicate with the instance of the generic interface to obtain monitoring data from the monitoring device;
    an instance of an adapted resource, wherein the adapted resource is specifically configured to interface with the corresponding application to be adapted, with each adapted resource wrapping calls of the corresponding application; and
    an instance of a reusable resource, with each resource bridging semantics of the information broker with semantics of the corresponding application being adapted through the instance of the adapted resource;
    consolidating and converting the monitoring data into a common format using the information broker;
    parsing the monitoring data into a plurality of programs each assigned a unique monitoring task;
    selectively extracting information from each of the plurality of programs to generate a summary view for display of the extracted information; and
    displaying an end-to-end view of the system with multiple images representing different components of the system and the operations status of each such component.

2. A method as in claim 1 including selecting and arranging parts of the monitoring data into different groups, each corresponding to a different role of personnel in the organization providing the services, and displaying for a particular role, on demand, a selected one of the groups.

3. A method as in claim 1 in which the components include two or more components selected from the group consisting of data centers; routers; and end users.

4. A method as in claim 1 in which said display includes a map with each of the components shown at a location representing each component's approximate geographical location in the system.

5. A method as in claim 1 in which one of the plurality of programs includes a particular monitoring tasks of providing a list of service interruption events.

6. A method as in claim 5 in which the list includes a trouble ticket list.

7. A method as in claim 5 in which the list includes a data processing asset list.

8. A method as in claim 1 in which one of the plurality of programs includes a particular monitoring task of providing network performance data.

9. A method as in claim 1 in which one of the plurality of programs includes a particular role of providing statistics for the system for at least one previous time period.

10. A method as in claim 9 in which the statistics include historical service level agreement compliance and current service level agreement compliance statistics.

11. A method as in claim 1 in which the summary view includes information selected from a group consisting of:
   a number of service interruption events which have occurred within a recent time period;
   a number of existing open service tickets;
   network server performance;
   network performance;
   workstation performance; and
   a combination of any two or more of said items of information.

12. A method as in claim 2 in which the particular role is that of an end user, and the group displayed includes network availability information.

13. A method as in claim 2 in which the particular role is that of an end user, and the group displayed includes outstanding service requests for service in the system.

14. A method as in claim 2 in which the particular role is that of an end user, and the group displayed includes server response time.

15. A method as in claim 2 in which the particular role is selected from the group comprising:
   a data processing system operator;
   a data processing system manager; and
   an end user, and
   in which access to information other than that designated for the role is denied unless access is given special approval.

16. A method of integrating the functions of different computer programs, each connected to display output information in a separate display, said method comprising:
   monitoring one or more portions of a data processing services system using monitoring devices to determine whether terms of a service level agreement are met for a plurality of end users coupled to a data processing service organization;
   using an instance of a generic adapter for each of the one or more portions of the data processing services system, the generic adapter providing monitoring information to an information broker in a common format and comprising:
   an application-specific software component for adapting semantics of the information broker to semantics of the one or more portions of the data processing services system;
   a reusable generic interface for providing the information broker uniform access to each of the one or more portions of the data processing services system based on the adapted semantics provided by the application-specific software component in a type defined by the information broker;
   an instance of an adapted resource, wherein the adapted resource is specifically configured to interface with a selected portion of the one or more portions of the data processing services system to be adapted, with each adapted resource wrapping calls of the corresponding selected portion; and
   an instance of a reusable resource, with each resource bridging semantics of the information broker with semantics of the corresponding selected portion being adapted through the instance of the adapted resource;
   consolidating the monitoring information into a single format;
   parsing the monitoring data into a plurality of computer programs each assigned a unique monitoring task;
   selectively extracting information from each of the plurality of computer programs to generate a summary view for display of the extracted information; and
   displaying an end-to-end view of the system with multiple images representing different components of the system and the operations status of each such component.

17. A method as in claim 16 in which the different computer programs include at least one service oriented impact analysis program.

18. A method as in claim 16 in which selectively extracting information comprises reducing the extracted information selected from at least one of the different computer programs to the minimum needed by the person to perform the specific function.

19. A method as in claim 16 in which selecting the output information and consolidating the monitoring information are performed with the use of enterprise information integration software serving as the information broker.

20. A method as in claim 19 in which the enterprise information integration software is selected from the group consisting of enterprise application integration software; extract, transform and load software; enterprise information integration software; and a combination of two or more of the foregoing.

21. A method as in claim 16 using web-based software to produce at least one custom-selected computer display screen view of the extracted information.

22. A method as in claim 17 in which the service oriented impact analysis software includes knowledge software to provide data regarding prior experiences with service problems.

23. A method as in claim 16 in which the person is selected from the group consisting of: a data processing system manager; a manufacturing production manager; a customer relations manager; and a financial manager.

24. A method as in claim 19 in which the different computer programs include at least one component systems management program, at least one service management program; and the method further includes displaying service desk information and component systems management information.

25. A method as in claim 16 in which the different programs include at least one business information development program which is selected from the group consisting of: human resources; finance; accounts payable; accounts receivable; inventory; sales; taxes; and combinations of two or more of the foregoing.

26. A system for gathering information concerning the operations of a data processing service organization from a network and displaying selected items of said information for specific personnel categories, said system comprising:
   a component systems management sub-system comprising at least one computer programmed with component systems management software for network performance reporting to determine whether terms of a service level agreement are met for a plurality of end users;
   a service delivery management sub-system comprising at least one computer programmed with service delivery management application software for supplying information to at least one service desk;
   a service-oriented impact analysis sub-system comprising at least one computer programmed with service-oriented impact analysis software for analyzing the impact of system service interruptions;
   a data integration services sub-system including at least one computer programmed with enterprise information integration software and interconnected with the component systems management, services delivery management, and services-oriented impact analysis sub-systems; and wherein the data integration services sub-system is programmed to receive monitoring information from network systems communicatively coupled to instances of a generic software adapter using a reusable generic interface for providing uniform access to software in each subsystem through the generic software adapter in a type defined by the enterprise information integration software;

wherein each generic software adapter includes an instance of a reusable resource interfacing with the generic software adapter, with each resource bridging semantics of an information broker to a corresponding one of a plurality of applications; and an instance of an adapted resource interfacing with the resource and specifically configured to interface with the corresponding application, with each adapted resource wrapping calls of the corresponding application to the instance of the resource; and wherein the component systems management sub-system is programmed to parse the monitoring information into a plurality of computer programs each assigned a unique monitoring task, and to selectively extract information from each of the plurality of programs to generate a summary view for display of the extracted information and for display of an end-to-end view of the system with multiple images representing different components of the system and the operations status of each such component.

27. A system as in claim 26 including an information technology business information sub-system connected to communicate with the data integration services sub-system.

28. A system for providing data processing services, said system comprising:
- a plurality of data centers each having data processing equipment;
- a plurality of routers;
- a plurality of end-user work stations;
- a large area network interconnecting said data processing equipment, routers and end-user work stations;
- multiple units of monitoring equipment connected to said network for monitoring the provision of data processing services to determine whether terms of a service level agreement are met for the plurality of end-user work stations, and providing data reporting on the performance of the system; and
- integration equipment for extracting receiving monitoring data from the multiple units of monitoring equipment, using multiple instances of a generic adapter, each generic adapter comprising,
  - a reusable generic software interface that provides uniform access between the generic adapter and the integration equipment and software that adapts semantics of integration equipment to semantics of one of the multiple units of monitoring equipment,
  - an instance of an adapted resource, wherein the adapted resource is specifically configured to interface with a corresponding application to be adapted to provide monitoring information, with each adapted resource wrapping calls of the corresponding application; and
  - an instance of a resource, with each resource bridging semantics of the information broker with semantics of the corresponding application through the instance of the adapted resource;
- wherein the monitoring equipment is configure to parse the monitoring data into a plurality of programs each assigned a unique monitoring task, and to selectively extracting information from each of the plurality of programs to generate a summary view for display of the extracted information.

29. A system as in claim 28 and further comprising composing a plurality of consolidated displays of the extracted information in which each of the consolidated displays contains information designed for personnel filling a specific role in the organization, and including programming to prevent selected other personnel from seeing selecting ones of said displays.

30. A system as in claim 29 in which the specific roles include operational and management personnel, and end users of said system.

* * * * *

UNITED STATES PATENT AND TRADEMARK OFFICE
CERTIFICATE OF CORRECTION

PATENT NO. : 8,386,597 B2  
APPLICATION NO. : 11/223537  
DATED : February 26, 2013  
INVENTOR(S) : Mark T. Fulgham et al.

Page 1 of 1

It is certified that error appears in the above-identified patent and that said Letters Patent is hereby corrected as shown below:

In the Claims:

In column 24, line 7, in Claim 28, after "for" delete "extracting".

Signed and Sealed this
Twenty-eighth Day of May, 2013

Teresa Stanek Rea
*Acting Director of the United States Patent and Trademark Office*